US008131718B2

(12) United States Patent
Tran

(10) Patent No.: US 8,131,718 B2
(45) Date of Patent: Mar. 6, 2012

(54) INTELLIGENT DATA RETRIEVAL SYSTEM

(75) Inventor: Bao Q. Tran, San Jose, CA (US)

(73) Assignee: Muse Green Investments LLC, Dover, DE (US)

( * ) Notice: Subject to any disclaimer, the term of this patent is extended or adjusted under 35 U.S.C. 154(b) by 845 days.

(21) Appl. No.: 11/301,561

(22) Filed: Dec. 13, 2005

(65) Prior Publication Data

US 2007/0136264 A1 Jun. 14, 2007

(51) Int. Cl.
*G06F 17/30* (2006.01)
(52) U.S. Cl. ....................................... 707/732
(58) Field of Classification Search .................. None
See application file for complete search history.

(56) References Cited

U.S. PATENT DOCUMENTS

| | | | |
|---|---|---|---|
| 5,463,696 A | 10/1995 | Beernink et al. | |
| 5,537,590 A | 7/1996 | Amado | |
| 5,548,506 A * | 8/1996 | Srinivasan | 705/8 |
| 5,983,200 A * | 11/1999 | Slotznick | 705/26 |
| 6,108,686 A * | 8/2000 | Williams, Jr. | 709/202 |
| 6,438,579 B1 * | 8/2002 | Hosken | 709/203 |
| 6,636,848 B1 * | 10/2003 | Aridor et al. | 707/3 |
| 6,757,587 B1 * | 6/2004 | English et al. | 700/245 |
| 7,065,349 B2 * | 6/2006 | Nath et al. | 455/419 |
| 7,069,259 B2 * | 6/2006 | Horvitz et al. | 706/25 |
| 2001/0034661 A1 * | 10/2001 | Ferreira | 705/26 |
| 2002/0198740 A1 | 12/2002 | Roman et al. | |
| 2004/0215626 A1 * | 10/2004 | Colossi et al. | 707/100 |
| 2004/0268215 A1 * | 12/2004 | Trossen et al. | 715/500 |
| 2005/0132032 A1 * | 6/2005 | Bertrand | 709/223 |
| 2007/0026871 A1 * | 2/2007 | Wager | 455/456.1 |

* cited by examiner

*Primary Examiner* — Naveen Abel Jalil
*Assistant Examiner* — Kellye Buckingham
(74) *Attorney, Agent, or Firm* — Christensen O'Connor Johnson Kindness PLLC

(57) ABSTRACT

An electronic assistant for managing and locating data of interest for a user that, autonomously and without explicit user request, schedules and executes multiple information retrieval tasks in accordance with the user's priorities, deadlines and preferences, said handheld device including a computer-implemented assistant coupled to said information locator, wherein the assistant automatically recommends an event or plans a travel trip based on said user styles, techniques, preferences, or interests, and location and time of the handheld.

19 Claims, 24 Drawing Sheets

INTELLIGENT DATA RETRIEVAL SYSTEM

BACKGROUND

In today's fast paced working environments, companies are deploying information technology to increase their employees' effectiveness. Concurrently, the increasing familiarity of users with computers, is forcing traditional sources of information such as newspapers, magazines, and television to offer computer readable counterparts in order to compete with on-line services such as Compuserve. America Online, Prodigy, among others. The computer readable news sources are typically available for free on a graphical digital depository known as a World Wide Web (WWW) on an Internet. Although more information is generally viewed as being more desirable, more information does not necessarily translate into greater knowledge, particularly if the user is inundated with irrelevant information.

As the transformation of information into knowledge is a cognitive process, the information needs to be prioritized and ranked in some manner to avoid saturating the user with an information overload. Such saturation tends to cause the user to ignore more relevant information which may lead to better decision making. Hence, the information needs to be filtered to better fit the requirements of the user. In some of these systems, news is already categorized or filtered for readers. For instance, those that subscribe to certain magazines or newspapers or view certain television networks, already have the vast base of electronically-available information (e.g., wire services) filtered for them. However, this "filtering" is performed on a large-scale basis, for a wide audience. The tailoring of specific stories of interest to particular users has not been performed by these magazines, newspapers or television networks.

Currently, a user needs to manually search and scan various information sources in order to obtain articles, postings, or other files of interest. The search typically uses a combination of keywords and Boolean constructs such as "and" and "or." As these systems require some training and technical familiarity, few computer users can navigate the multiplicity of data formats and learn one or more languages to access different information repositories. However, as an even experienced user may not apply all possible search criteria at the onset of the search section, the keyword terms may not be as broad as possible to capture every file on the target topic. At the same time, the applied keywords may be unfocused or imprecise, leading to the partial retrieval of irrelevant articles. These problems accentuate the need to repeat search sessions, wasting the user's time and resources in foraging for information.

As an example, on the Internet, the user manually scans areas or sources of interest, including publications, USENET Newsgroups, or other areas classified by topic, to find areas of interest. Alternatively, the user can locate articles of interest by accessing a search engine such as Lycos or Alta Vista. The user then retrieves articles or files which have subject headings, for example, matching those which the user wishes to read. For example, in USENET Newsgroups on the Internet, postings frequently have relevant subject headings to permit manual scanning, similar to that provided by article headings in newspapers/magazines. The user can read the stories which have been filtered by topic, and subject heading, and if anytime during the viewing of the story the user wishes to ignore the rest of the article, he can stop reading it and simply discard the story. If desired, the user can download the remaining stories for off-line viewing as conventional. However, the manual scanning process is quite time-consuming, particularly as sources of information or data on the World Wide Web grow in scale and complexity. Further, the retrieval of irrelevant documents unnecessarily retards the delivery of more relevant information. Additionally, the presentation of irrelevant articles needlessly confuses and overloads the user's comprehension capacity.

As users conventionally need to repeatedly refine their queries to find satisfactory sets of documents, traditional methods for performing on-line search is tedious and expensive. Moreover, during the search, the user could be obligated to adapt to the query language while he or she moves from one database to another. Additionally, the user is aware of neither the quantity and type of available information nor its location. Further, the user is not aware of new entries and/or changes in the repositories. Thus, the ability to automatically sort through the large variety of electronic sources in order to generate a subset of the stories available in electronic form which is tailored to a user's specific interests is desired. Thus, end users are facing greater hurdles in tracking information relevant to their interests.

In response to the information overload, intelligent agents have been applied to help users make sense of the barrage of data available to them. An intelligent agent is a specialized program which communicates and exchanges data with databases and other intelligent agents, and the interface to these agents is called a personal assistant. Personal assistant programs, which use rule-based algorithms such as expert systems or training-based algorithms such as neural networks, have been adapted for automatically performing tasks on the workstation to reduce the information overload, particularly in an office environment. These personal assistants assist the user in handling a fixed set of events, conditions, and actions taken when the designated event occurs under the stated conditions. In general, the intelligent agent possesses the following characteristics:

1. Delegation: The user entrusts the agent to tackle some or all of an activity.

2. Personalization: The user determines how the agent interacts. In many cases, the agent learns about the user and adapts its act ions accordingly (along the lines of a personal assistant).

3. Sociability: The agent is able to interact with other agents in ways similar to interpersonal communications: This includes some degrees of give and take, flexibility, and goal-oriented behavior.

4. Predictability: The user has a reasonable expectation of the results.

5. Mobility: The ability to go out—usually onto the network—to accomplish the delegated task.

6. Cost effective: The benefits gained by the user, including time, information, filtering, among others, should be of greater value than the cost (monetary, time, re-work, etc.).

7. Skills: The agent has its own expertise. A simple agent may be capable of only executing a simple command containing no ambiguity or the ability to effectively deal with the ambiguity in the command.

8. Living within constraints: This can be as simple as, "find me the suit, but do not purchase it," or become as complex as, "go only to the most likely information sources, since there is a fee to just access an information source." Some information services, for example, allow the user to set the maximum amount of money to be spent on any search.

Intelligent agents are typically built using rule-based expert systems as well as pattern recognizers such as neural networks. As discussed in U.S. Pat. No. 5,537,590, expert systems (also called knowledge systems) are defined to be intelligent computer programs that use knowledge and inference procedures to solve problems that are hard enough as to require in their solution, significant expertise. Expert systems typically consist of an interpretive language where the user may write his or her program statements and the conditions associated with those statements, an inference engine, which provides the mechanism through which the expert rules are interpreted and fired, and an executive front-end or expert shell, that helps users write application programs using the language, and that helps them run the expert applications developed, and that also helps them develop and query reports or the generated diagnostics.

Expert (knowledge) systems contain two basic elements: inference engine and knowledge base. The knowledge base holds all information related to the tasks at hand: the rules and the data on which they will be applied. The inference engine is a mechanism that can operate the information contained in the knowledge base. In a rule-based system, the knowledge base is divided into a set of rules and working memory (or database). Just like an IF-THEN sentence, each rule has two parts: a premise and a conclusion. A rule is said to be fired when the inference engine finds the premise is stored as TRUE in working memory (the knowledge base) and it incorporates the conclusion of the rule to the working memory (knowledge base) too. Working memory is the database contained in the knowledge base. This holds all facts that describe the current situation. Generally, the expert system will start with very few facts. These will expand as the system learns more about the situation at hand, and as far as some rules are executed. The inference engine or rule interpreter has two tasks. First, it examines facts in working memory and rules in the rule base, and adds new facts to the database (memory) when possible. That is, it fires rules. Second, it determines in what order rules are scanned and fired. The inference engine can determine the order in which rules should be fired by different methods such as forward chaining, backward chaining, breadth- or depth-wise scan techniques, etc. Applications that use forward chaining, such as process control, are called data-driven. Applications that use backward chaining are called goal-driven. Forward chaining systems are typically used where relevant facts are contained in small sets and where many facts lead to few conclusions. A forward chaining system must have all its data at the start, rather than asking the user for information as it goes. Backward chaining should be used for applications having a large set of facts, where one fact can lead to many conclusions. A backward-chaining system will ask for more information if needed to establish a goal.

In addition to expert systems, a pattern recognizer called neural networks can be used. Neural networks attempt to mimic the human brain by "learning" different sets of stimulus patterns (such as medical symptoms) and their associated responses (diagnoses). Incomplete and/or overlapping sets of stimuli can be presented to the neural network, which can then return several responses matching those stimuli using probability weightings to produce an ordered list of responses. Each neural network problem session contains a set of defined stimuli, a set of defined responses, and a set of relationships between specific groups of stimuli and the response that each group is to produce. The set of stimuli (responses) is represented by a group of stimulus (response) nodes at what is called the "input (output) layer." Then, there is usually one or more intermediate layers, containing nodes that are each linked to every input layer node and every output layer node in the network. The number of the middle layer nodes is usually equal to the average of the number of input and output nodes. Probability values (weights) are then associated with each of these connections and are constantly being updated as the network "learns" new information.

Further, when a planning agent works in a complex, real-world domain, it is unable to plan for and store all possible contingencies and problem situations ahead of time. The agent needs to be able to fall back on an ability to construct plans at run time under time constraints. Thus, a system for performing dynamic planning at run time is needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic assistant which dispatches tasks on the user's behalf and according to his or her preferences is disclosed. The assistant has an enactor for processing data received from a sensor and for changing its environment via an actuator. The enactor receives instruction from a predictor/goal generator, which in turn is connected to a general knowledge warehouse. Additionally, the warehouse and the predictor/goal generator are connected to a plurality of specialist knowledge modules, including a scheduler, an information locator, a communicator, a form filler, a trainer, a legal expert, a medical expert, and other experts.

The electronic assistant provides an interface which frees the user from learning complex search languages and allows some functions to be automatically performed. A variety of machine learning processes allow the assistant to learn the user's styles, techniques, preferences and interests. After learning about the user's interests in particular types of information, the assistant guides the user through the process of on-line information source selection, utilization, and interaction management via the information locator. The information locator generates a query conforming to the user characteristics for retrieving data of interest. The information locator next submits the query to one or more information sources. Upon receipt of results of the submitted query, the information locator communicates the results to the user, and updates the knowledge warehouse with responses from the user to the results. The assistant supports the ability to refine the query and to manage the costs associated with the search. Further, the assistant automatically incorporates data relating to changes in the query interface and other relevant characteristics of the information sources so that search command sequences can be altered without user interaction. The search configuration of each search carried out by the user is saved in a database. The data maintained in the database includes keywords and concepts for search, interval between subsequent searches, deadline for the search, the number of documents to acquire from each engine, and domain over which to do the search, including the preferred set of search engines or the preferred set of news groups.

The assistant then automatically schedules and executes multiple information retrieval tasks in accordance with the user priorities, deadlines and preferences using the scheduler. The scheduler analyzes durations, deadlines, and delays within its plan while scheduling the information retrieval tasks. The schedule is dynamically generated by incrementally building plans at multiple levels of abstraction to reach a goal. The plans are continually updated by information received from the assistant's sensors, allowing the scheduler to adjust its plan to unplanned events. When the time is ripe to perform a particular search, the assistant spawns a child process which sends a query to one or more remote database engines. Upon the receipt of search results from remote engines, the information is processed and saved in the database. The incoming information is checked against the results of prior searches. If new information is found, the assistant sends a message to the user.

When the assistant operates in an environment equipped with a handheld computer which is adapted to work with a host computer, the assistant splits into two personalities, one residing on the handheld computer with an intelligent desktop assistant for interacting with the user and one residing on a host computer with an information locator for executing searches in the background. When results are found, the assistant running on the host computer prioritizes the retrieved documents. Further, the assistant on the host computer transforms the data designed to be sent to the handheld computer into an equivalent file optimized for fast and robust wireless transmission. The assistant then immediately transmits the transformed, high priority documents to the handheld computer through a wireless modem while withholding lower priority documents for transfer when the handheld computer docks with the host computer to minimize data transmission costs. Further, upon docking, the assistant on the handheld computer synchronizes its knowledge base with the assistant running on the host computer to ensure that the personalities on the handheld and host computers have consistent knowledge of their environments.

In this manner, the assistant intelligently interacts and assists the user in navigating the complexities of cyberspace such that the user is not aware of the functions performed by the assistant. Further, the learning processes update the assistant's knowledge of the user's changing needs and preferences. Hence, documentation will not be needed, as the interface characteristics are updated to reflect the changing experience of the user. The present disclosure thus efficiently filters the universe of information available and displays only information of interest to the user. The provision of precision and timely access to information enables for a more accurate assessment or situational analysis by the user.

BRIEF DESCRIPTION OF THE DRAWINGS

The accompanying drawings, which are incorporated in and form a part of this specification, illustrate embodiments of the disclosure and, together with the description, serve to explain the principles of the disclosure.

DETAILED DESCRIPTION

Figure 1:
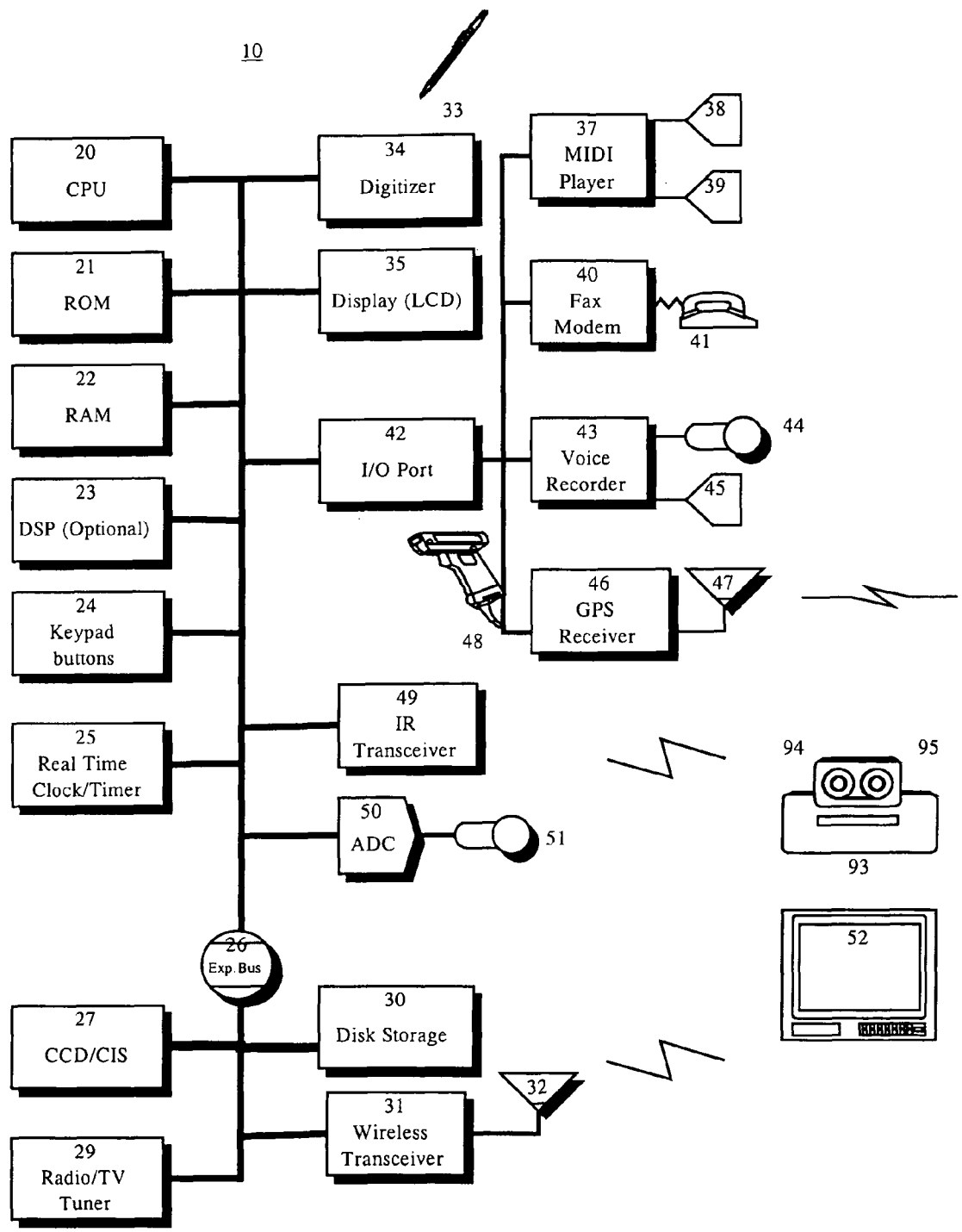
FIG. 1 is a block diagram of a portable computer system for providing data management support in accordance with the present disclosure.

FIG. 1 illustrates a portable computer system of the present disclosure for managing data. The computer system can be housed in a small, rectangular portable enclosure. Referring now to FIG. 1, a general purpose architecture for entering information into the data management system by writing or speaking to the computer system is illustrated. In FIG. 1, a processor 20 or central processing unit (CPU) provides the processing capability for the sketching system of the present disclosure. The processor 20 can be a reduced instruction set computer (RISC) processor or a complex instruction set computer (CISC) processor. The processor 20 can be a low power CPU such as the MC68328V DragonBall device available from Motorola Inc.

The processor 20 is connected to a read-only-memory (ROM) 21 for receiving executable instructions as well as certain predefined data and variables. The processor 20 is also connected to a random access memory (RAM) 22 for storing various run-time variables and data arrays, among others. The RAM 22 is sufficient to store user application programs and data. In this instance, the RAM 22 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 21 for data back-up purposes. The RAM 22 stores a database of the spreadsheet of the present disclosure, among others.

The computer system 10 of the present disclosure has built-in applications stored in the ROM 21 or downloadable to the RAM 22 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. In addition to the built-in applications, add-on applications such as time and expense recording systems taught in U.S. application Ser. No. 08/650,293, entitled "TIME AND EXPENSE LOGGING SYSTEM," sketching/drawing tools as filed in U.S. application Ser. No. 08/684,842, entitled "GRAPHICAL DATA ENTRY SYSTEM," and spreadsheet and browser as discussed in U.S. application Ser. No. 08/741,377, entitled "DATA MANAGEMENT SYSTEM," all hereby incorporated by reference, can be added to increase the user's efficiency. Additionally, project planning tools, and CAD/CAM systems, among others, may be added to increase the functionality of portable computing appliances. Users benefit from these software applications, as the software applications allow users to be more productive when they travel as well as when they are in their offices.

The processor 20 is also connected to an optional digital signal processor (DSP) 23 which is dedicated to handling multimedia streams such as voice and video information. The DSP 23 is optimized for video compression using JPEG/MPEG standards known to those skilled in the art. Furthermore, the DSP 23 is equipped to handle the needs of a voice recognition engine. Although the DSP 23 is shown as a separate unit from the CPU 20, the present disclosure contemplates that the DSP 23 can also be integrated with the CPU 20 whereby the CPU 20 can rapidly execute multiply-accumulate (MAC) instructions in either scalar or vector mode.

The computer system 10 of the present disclosure receives instructions from the user via one or more switches such as push-button switches in a keypad 24. The processor 20 is also connected to a real-time clock/timer 25 which tracks time. The clock/timer 25 can be a dedicated integrated circuit for tracking the real-time clock data, or alternatively, the clock/timer 25 can be a software clock where time is tracked based on the clock signal clocking the processor 20. In the event that the clock/timer 25 is software-based, the software clock/timer can be interrupt driven to minimize the CPU loading. However, even an interrupt-driven software clock/timer 25 requires certain CPU overhead in tracking time. Thus, the real-time clock/timer integrated circuit 25 is preferable where high processing performance is needed.

Further, the timer portion of the clock/timer 25 can measure a duration count spanning one or more start times and completion times, as activated by the user. The timer portion has a duration count register which is cleared upon the start of each task to be timed. Further, the timer portion of the clock/timer 25 has an active state and a passive state. During operation, when the user toggles the timer portion into the active state, the duration count register is incremented. When the user toggles the timer portion into the suspended state, the duration count is preserved but not incremented. Finally, when the user completes a particular task, the value of the duration count register is indicated and stored in a database to track time spent on a particular task.

To provide for expandability, the processor 20 drives a low power expansion bus 26 which resembles a PCMCIA bus but optimized for maximizing battery life of the computer of FIG. 1. The acronym PCMCIA represents both the PC Card standard (which specifies both card hardware and system software requirements), and the organization responsible for developing it. Originally, the standard was designed exclusively for memory cards (Release 1.0) used in small handheld and laptop systems in lieu of a floppy disk drive known as Type I cards. The next PCMCIA standard (Release 2.0 and up) were expanded to include I/O cards, such as modems or network cards. A thicker Type III card and Type IV card were also defined and are often used for hard drives. Further, a memory resident driver called Socket Services is present. Once loaded, Socket Services talks directly to the expansion bus hardware, and other programs talk to Socket Services to control a PC Card in one of that adapter's slots. A software layer called Card Services acts as a librarian of system resources. When Card Services is started, system resources (I/O ranges, interrupts, and memory ranges) are given to it; the resources it is given are usually configurable by running a program provided with the expansion bus software. The program that does the resource allocation may be a stand-alone program, or it may be built into an enabler. The resources used may be listed in a file, or might be specified on the command line of the enabler or Card Services. As each PC Card is inserted in the system, Card Services hands out these resources as needed to configure the card; when cards are removed, these resources are returned to Card Services to reuse. This allows any combination of cards to work without conflict. All Socket Services drivers must be loaded before Card Services, because Card Services uses Socket Services to access the adapter hardware. The bus 26 can accept hard disk drives such as ATA compatible hard drives. ATA stands for AT Attachment (IBM AT personal computer attachment), and is an interface which is electrically identical to a common hard disk interface. ATA mass storage devices, whether mechanical hard disks or solid-state memory cards which appear as disk drives, require another driver to be loaded in the system. ATA drivers must be loaded after Socket Services and Card Services. When hard disk drives are used, a filing system is provided. In the event that the disk drive is a solid state disk drive employing flash memory or other non-volatile memory. In the disclosure, a Flash Filing System (FFS) is provided to handle the peculiarities of flash memory cards, including a limited write cycle, often on the order of 10,000 writes or so, before wearing out as well as the delay associated with erasing and rewriting information on these cards. The FFS driver performs wear-balancing to avoid wearing out the media prematurely, and works to hide performance delays in writing to the card.

Via the bus 26, the computer system can also acquire visual information via a charged coupled device (CCD) or a CIS unit 27. The CCD/CIS unit 27 is further connected to a lens assembly, not shown, for receiving and focusing light beams to the CCD or CIS for digitization. The CCD/CIS unit 27 thus can be either a digital camera or a page scanner. Images scanned via the CCD/CIS unit 27 can be compressed and transmitted via a suitable network such as the Internet, via cellular telephone channels or via facsimile to a remote site.

In the event where the CCD/CIS unit 27 is a camera and where the application is videoconferencing, the CPU 20 and/ or the DSP 23 operate to meet the ITU's H.324 standard on multimedia terminal for low-bit-rate visual services for analog telephony. The DSP 23 can support H.261 video encoding and decoding at CIF resolution of up to 15 frames per second, H.263 video and G.723 audio, MPEG-1 audio and video play-back, MPEG-1 video encoding, JPEG and motion JPEG, and advanced motion estimation, input and output video scaling, noise-reduction filters and forward error correction.

The expansion bus 26 is also adapted to receive a radio tuner or a TV tuner 29, which is in turn connected to a built-in antenna. The radio/TV tuner 29 receives radio and/or TV signals and digitizes the information for suitable processing by the CPU 20. In this manner, the user of the computer 10 can listen to the radio or watch television while he or she works. The bus 26 is also adapted to receive a data storage device, or disk 30. Additionally, the bus 26 can receive a wireless transceiver 31, which is connected to an antenna 32. The wireless communication device 31 satisfies the need to access electronic mail, paging, mode/facsimile, remote access to home computers and the Internet. One simple form of wireless communication device 31 is an analog cellular telephone link where the user simply accesses a cellular channel similar to the making of a regular voice call. However, the transmission of digital data over an analog cellular telephone network can give rise to data corruption. Digital wireless networks such as cellular digital packet data (CDPD) can be used. CDPD provides data services on a non-interfering basis with existing analog cellular telephone services. In addition to CDPD, a communication service called Personal Communication Services (PCS) allows wireless access into the public service telephone network.

The two-way communication device 31 can also be a two-way pager where the user can receive as well as transmit messages. The two-way communication device supports a Telocator Data Protocol by the Personal Communications Association for forwarding binary data to mobile computers. The standard facilitates transmission of images and faxes over paging and narrowband PCS networks. Alternatively, the two-way communication device 31 can be substituted with a cellular telephone, whose block diagram and operation are discussed in detail in a co-pending U.S. application Ser. No. 08/461,646, hereby incorporated by reference.

In the event that two-way pagers are used, the present disclosure contemplates that the two-way communication device 31 be compatible with pACT (personal Air Communications Technology), which is an open standard developed by Cirrus Logic—PCSI and AT&T Wireless Services Inc. (Kirkland, Wash.). pACT is a narrowband, 900 Mhz range PCS technology derived from the cellular digital packet data transmission standard. pACT is optimized for applications such as acknowledgment paging, mobile e-mail, wireless Internet access, voice paging, personal home security and dispatch services. Based on the Internet IP standard, pACT provides full data encryption and authentication, enabling the efficient, full delivery of reliable and secure messages. Alternatively, in place of pACT, a REFLEX protocol from Motorola Inc. may be used. The REFLEX protocol is commercially supported by SkyNet-Mtel Corporation.

The two-way communication device 31 has a receiver, a transmitter, and a switch, all are controlled by the CPU 20 via the bus of the portable computer system of FIG. 1. The switch receives an input from the antenna 32 and appropriately routes the radio signal from the transmitter to the antenna 32, or alternatively, the radio signal from the antenna 32 to the receiver in the event the processor 20 is expecting a message. Via the bus 26, the processor 20 controls the receiver, the transmitter, and the switch to coordinate the transmission and receipt of data packets. The receiver and transmitter are standard two-way paging devices or standard portable cellular communication chips available from Motorola, Inc. in Schaumburg, Ill. or Philips Semiconductors in Sunnyvale, Calif. The antenna 32 can be a loop antenna using flat-strip conductors such as printed circuit board wiring traces as flat strip conductors have lower skin effect loss in the rectangular conductor than that of antennas with round-wire conductors.

Turning now to the structure of the data packet to be transmitted/received to and from the two-way communication device 31. A plurality of fields are provided, including a header field, a destination address field, a source address field, a date/time stamp field, a cyclic redundancy check field, and a data field. The header field functions as a synchronization field. In the transmitting direction from the base station to the two-way communication device 31, the destination address field specifies the unique address for the receiving two-way communication device 31. The source address field in the transmitting direction from the base station to the two-way communication device 31 specifies the base station identification address, which may change to account for base station rerouting in the event that two-way communication device roaming is allowed. In the transmitting direction from the two-way communication device 31 to the base station during a reply session, the source address field contains the two-way communication device 31 address to permit the base station to identify the reply pages transmitted to a previously sent page.

The date/time stamp field contains data reflecting the second, minute, hour, day, month and year of the transmitted packet. The date/time stamp information allows the base station to determine to send a time-out message to the individual initiating the page request in the event that the two-way communication device 31 does not timely acknowledge receipt of the page message. The cyclic redundancy check (CRC) field allows the two-way communication device 31 to verify the integrity of the messages received and transmitted by the two-way communication device 31. The data status includes coherency information enabling the host computer and the computer of FIG. 1 to synchronize data. The data status field carries information such as whether the data has been modified, the staleness of the data, the replacement status of the data, among others. The data field is a variable length field which allows variable length messages to be transmitted to and from the two-way communication device 31.

In the two-way paging embodiment using the two-way communication device 31, the user can be paged and can reply as well. A page originator wishing to send an alphanumeric page to the user of the computer system of FIG. 1 places a call using a telephone or an originating computer. The telephone interface routes the call to the base station. The computer at the base station will either digitally or verbally query the page originator to enter an identification number such as a telephone number of the two-way communication device 31. After entry of the identification, the base station computer further prompts the page originator for the message to be sent as well as the reply identification number, or the call-back number. Upon receipt of the paging information, the base computer transmits a page message to the computer system with the two-way communication device 31 of FIG. 1, which may reply using predetermined text templates, or more flexibly using keyboard, voice, handwriting, sketching or drawing, as discussed in the incorporated by reference U.S. patent application Ser. No. 08/684,842, entitled "GRAPHICAL DATA The present disclosure can be compatible with Always-On-Always-Connected (AOAC) mobile clients connected to the Internet via wireless communications. The wireless messaging networks based on GSM/SMS, pACT, Reflex, and similar narrowband 2-way paging services are significantly different from existing packet networks in that (1) Packet sizes are small (typically around 100 bytes); (2) Typical latency is much longer (on the order of seconds to minutes); and (3) The connection is much more intermittent. Narrowband sockets (NBS) were created to overcome these limitations by providing fragmentation and reassembly, reliability, and tolerance for intermittency to complement circuit switched connections with low bandwidth connections over wireless messaging networks. The NBS enables a new class of mobile usage, AOAC, with exciting applications like automatic (background) forwarding of email, up to date news, weather, traffic, and personal messaging. It enables the existing cellular and wireless messaging infrastructure to send arbitrary data, rather than just alpha-numeric pages. Thus, the present isclosure, in conjunction with NBS, allows data to find the user, rather than the user always having to initiate the retrieval for the information.

The Datagram Protocol for NBS is a general purpose, unreliable, connectionless datagram service. It is not intended for applications which require 100% reliable delivery, such as file transfers. NBS datagrams are usually formatted to be readable on devices without NBS. This is useful for sending text based messages to legacy pagers and voice phones NBS has a core set of required features that must be supported in order to provide consistent functionality to developers. However, each narrowband network has different features and header formats. The NBS stack will use existing transport features to implement these core requirements, where possible. The NBS stack performs queries to the hardware interface (NB-SERIAL NDIS miniport) for available network features. If required features such as ports and fragmentation are not supported by the network, then the NBS stack adds these features to the payload of each message. Datagram packets are transferred using the message services of an underlying network, where typically the bandwidth is small and communication is wireless. The protocol assumes the device addressing (Destination Address and the Originating Address) is handled at a higher level, and only adds those features necessary (generally port level addressing and fragmentation). In order to implement a NBS datagram protocol, the following fields are necessary: DstPort—The logical port of the destination application (dd); SrcPort—the logical port of the sender application (as in UDP) (oo); RefNum—the sequence number of the datagram (kk); MaxNum—the total number of fragments in a single datagram (mm); SeqNum—the sequence number of the fragment, inside the datagram (nn). The datagram protocol headers are part of the data segment of the NBS message fragment. The headers can be presented in a few formats, depending on the environment used. In the Windows environment, the NBS stack queries the hardware driver (through NDIS) for the current network and packet format. Messages sent shall primarily use the binary format, or the full text based header including the concatenation scheme.

The processor 20 of the illustrated embodiment accepts handwritings as an input medium from the user. A digitizer 34, a pen 33, and a display LCD panel 35 are provided to capture the handwriting. The digitizer 34 can have a character input region and a numeral input region which are adapted to capture the user's handwritings on words and numbers, respectively. The LCD panel 35 has a viewing screen exposed along one of the planar sides of the enclosure are provided. The assembly combination of the digitizer 34, the pen 33 and the LCD panel 35 serves as an input/output device. When operating as an output device, the screen 35 displays computer-generated images developed by the CPU 20. The LCD panel 35 also provides visual feedback to the user when one or more application software execute. When operating as an input device, the digitizer 34 senses the position of the tip of the stylus or pen 33 on the viewing screen 35 and provides this information to the computer's processor 20. In addition to the vector information, the present disclosure contemplates that display assemblies capable of sensing the pressure of the stylus on the screen can be used to provide further information to the CPU 20.

The illustrated embodiment accepts pen strokes from the user using the stylus or pen 33 which is positioned over the digitizer 34. As the user "writes," the position of the pen 33 is sensed by the digitizer 34 via an electromagnetic field as the user writes information to the data management computer system. The digitizer 34 converts the position information to graphic data that are transferred to a graphic processing software of the data logger computer system. The data entry/display assembly of pen-based computer systems permits the user to operate the data logging computer system as an electronic notepad. For example, graphical images can be input into the pen-based computer by merely moving the stylus over the surface of the screen. As the CPU 20 senses the position and movement of the stylus, it generates a corresponding image on the screen to create the illusion that the pen or stylus is drawing the image directly upon the screen. The data on the position and movement of the stylus is also provided to a handwriting recognition software, which is stored in the ROM 21 and/or the RAM 22. The handwriting recognizer suitably converts the written instructions from the user into text data suitable for saving time and expense information. The process of converting the pen strokes into equivalent characters and/or drawing vectors using the handwriting recognizer is described below.

With suitable recognition software, text and numeric information can also be entered into the pen-based computer system in a similar fashion. For example, U.S. Pat. No. 5,463,696, issued on Oct. 31, 1995, to Beernink et al., and hereby incorporated by reference, discloses a technique for analyzing and interpreting cursive user inputs to a computer, such as strokes or key depressions to the computer system. Inputs to the system are received at a user interface, such as a dual function display/input screen from users in the form of pen strokes or gestures. A database stores cursive input data strokes and hypotheses regarding possible interpretations of the strokes. Recognition of the input strokes and recognition of higher level combinations of strokes forming characters and words is performed using recognizers, or recognition domains, each of which performs a particular recognition task. A controller is provided for controlling the hypotheses database and for scheduling the recognition tasks in the recognition domains. Arbitration resolves conflicts among competing hypotheses associated with each interpretation. The recognition domains, or recognizers, generate two or more competing interpretations for the same input. The recognizers use a data structure called a unit, where a unit is a set of sub-hypotheses together with all their interpretations generated by a single recognizer.

In Beernink, the handwriting recognizer operates at a first level for identifying one or more groups of related sub-hypotheses using grouping knowledge. These grouped sub-hypotheses generate a unit with no interpretations for each group and store the unit in the database in what is called a piece-pool memory. The Beernink recognizer has a second level of operation where each unit generated in the grouping stage is classified to provide the unit with one or more interpretations. The classified units are stored in a unit pool memory. Two or more interpretations of the input data are combined in a hierarchical structure according to a predetermined scheme in successive steps to form higher level interpretations.

Although the Beernink recognizer is flexible and does not require that the user learns special gestures, its accuracy is not perfect. Because the letters in a cursive-lettered word are connected, the recognizer must guess at how to segment the strokes into individual characters. Since ambiguities exist even in stellar samples of penmanship, cursive handwriting recognizers such as those in Beernink face a challenging task in deciphering handwritings. For example, handwriting recognizers have difficulties in trying to determine where a cursive lower-case "n" and "m" begin and end when the two letters, distinguishable from one another only by their number of humps, are strung together in a word. The handwriting recognizer tackles such ambiguities by looking in its dictionary—to determine, for instance, which words have "m" before "n" and which have "n" before "m." The user can improve accuracy by writing characters further apart than usual, but that is inconvenient and contrary to the way humans write.

The handwriting recognizer of the present disclosure can recognize non-cursive characters. Unlike the Beernink approach to recognizing handwriting in which the user can print or write cursively, the non-cursive handwriting recognizer requires the user to learn to print characters in its fixed style using a basic character set, which can be a 36-character alphanumeric character set. In addition to the basic 26 letters and 10 digits, the non-cursive handwriting recognizer includes multi-step pen strokes that can be used for punctuation, diacritical marks, and capitalization. The non-cursive handwriting recognizer can be a software module called GRAFFITI, commercially available from U.S. Robotics, Palm Computing Division, located in Los Altos, Calif. Each letter in the non-cursive alphabet is a streamlined version of the standard block character—the letter A, for example, looks like a pointy croquet hoop, and the hoop must be started at the dot indicator at the lower right corner—as illustrated and discussed in more detail in the above incorporated-by-reference U.S. patent applications. By restricting the way the user writes, the non-cursive handwriting recognizer achieves a more perfect recognition and, as with stenography, supports an alphabet consisting of characters that can be written much more quickly than conventional ones.

The computer system is also connected to one or more input/output (I/O) ports 42 which allows the CPU 20 to communicate with other computers. Each of the I/O ports 42 may be a parallel port, a serial port, or alternatively a proprietary port to enable the computer system to dock with the host computer. In the event that the I/O port 42 is housed in a docking port 84 (FIG. 3), after docking, the I/O ports 42 and software located on a host computer 82 (FIG. 3) support an automatic synchronization of data between the computer system and the host computer. During operation, the synchronization software runs in the background mode on the host computer 82 and listens for a synchronization request or command from the computer system 10 of the present disclosure. Changes made on the computer system and the host computer will be reflected on both systems after synchronization. The synchronization software may only synchronize the portions of the files that have been modified to reduce the updating times.

The I/O port 42 can be a high speed serial port such as an RS-232 port, a Universal Serial Bus, or a Fibre Channel for cost reasons, but can also be a parallel port for higher data transfer rate. The I/O port 42 has a housing which is adapted to snappably connect to the housing of a Musical Instrument Digital Interface (MIDI) player 37, a fax modem 40, a voice recorder 43, a GPS receiver 46 and a barcode reader 48. When the I/O port 42 is connected to the MIDI player 37, the computer system 10 drives high quality audio speakers 38 and 39 which connect to the MIDI player 37 to support multimedia applications on the computer 10.

Originally developed to allow musicians to connect synthesizers together, the MIDI protocol is used in generating sound for games and multimedia applications. One advantage of MIDI is storage space, as MIDI data files are quite small when compared with sampled audio sounds. The reduction in storage space follows from the fact that MIDI file does not contain sampled audio data, but the instructions needed by a synthesizer to play the sound. Another advantage of MIDI is the ability to edit the file or to change the speed, pitch or key of the sound. The output of the MIDI player 37 is provided to an external multi-timbral MIDI synthesizer which can play many instruments such as piano, bass and drums simultaneously. The output of the MIDI player 37 can be connected to the synthesizer by wire or wirelessly such as by the infrared communication. In this manner, the MIDI player 37 generates high quality sound to enhance the user experience.

Additionally, via the serial port 42, a fax-modem 40 is adapted to receive information over a telephone 41 via a plain old telephone system (POTS) landline or over the radio frequencies and allow the user to access information untethered. Further, the modem 40 may serve as part of a wide-area-network to allow the user to access additional information. The fax-modern 40 can receive drawings and text annotations from the user and send the information over a transmission medium such as the telephone network or the wireless network to transmit or receive drawings/text to another modem or facsimile machine, allowing the user to communicate with the remote site on demand. The fax-modem 40 can be implemented in hardware or in software with a few additional components such as a DAA. The fax-modem 40 can be a 56 kbps modem using Lucent Technologies' DSP1643, a member of the Apollo™ modem chip set. The Lucent Technologies' modem chips are designed to accommodate software upgrades for future enhancements to V.flex2 technology from Lucent, so customers' investments will be protected as standards for 56 kbps modems evolve. Using the device, the present disclosure can achieve Internet connections at rates up to 56 kbps when both they and their Internet service providers (ISPs) and online service providers (OSPs) use modems that incorporate V.flex2 compatible modems. Alternatively, the fax-modem device 40 can be a two-way communication device which can receive text messages and graphics transmitted via radio frequency to the user for on-the-spot receipt of messages.

The fax-modem 40 can also be a digital simultaneous voice and data modem (DSVD), also available from Lucent Technologies. The modem, as specified in ITU-729 and 729 A specifications, appears as a conventional modem with a downline phone which allows users to place and carry telephone conversations and digital data on a single phone line. These modems multiplex voice data by capturing voices and digitally compressing them. Next, the compressed voice data and the digital data are multiplexed and transmitted to the remote end, which if compatible, decompresses the voice data and converts the digital data back to sound. Further, the digital data is presented to the remote computer as is usual. In this manner, the DSVD modem allows audiographic conferencing systems that rely on modems for data communication.

DSVD modems are utilized in the blackboard conferencing system in the present disclosure, as discussed in more detail below.

The I/O port 42 can also receive a voice recorder 43. Although voice can be captured, digitally processed by the DSP 23 or the CPU 20, stored internally in the RAM 22 for conversion into text or inclusion in a document or a file to be transmitted via a suitable network such as the Internet to a remote site for review, as discussed below, voice data can be stored externally and more economically using the voice recorder 43 which stores audio information in its own storage rather than the RAM 22 and thus can operate independently of the computer system of FIG. 1. The voice recorder 43 can be an ISD33240 from Information Storage Devices Inc. in San Jose, Calif. The voice recorder 43 captures analog sound data and stores the analog signals directly into solid state electrically erasable programmable ROM (EEPROM) memory cells which have been adapted to store 256 different voltage levels per cell. As the voice recorder 43 captures voice and audio signals directly into its EEPROM cells, the analog to digital conversion process is not needed. The CPU 20 communicates with the voice recorder 43 by sending the voice recorder 43 an address along with other control signals to the voice recorder 43. In this manner, the CPU 20 can control the location where sound is to be played and/or recorded. Furthermore, as the voice recorder 43 can operate even when it is detached from the computer system of the present disclosure, the user can simply separate the computer system and carry only the voice recorder 43 when necessary.

The voice recorder 43 is connected to the processor 20 via the I/O port 42. The I/O port 42 is connected to the CPU 20 via the bus and can forward commands from the processor 20 to the voice recorder 43. The voice recorder 43, the microphone 44 and the speaker 45 can be located in an external housing which snappably connects to the housing of the computer 10. Through the I/O port 31, the voice recorder 43 could be commanded by the CPU 20 to play or record audio segments at specific cell addresses when particular conditions are met. Furthermore, via a message management record as known to those skilled in the art, the CPU 20 allows the ability to perform on-the-fly edit, delete, or supplement messages stored by the voice recorder 43.

Although the voice recorder is normally controlled by the CPU 20, the voice recorder 43 also has one or more switches (not shown) to allow the user to manually operate the voice recorder 43 in the event that the voice recorder 43 has been ejected from the computer system. The switches provide user selectable options which include: "Goto Begin", "Skip to Next", "Record", "Stop", "Play Next", "Play Last." In this manner, even when the voice recorder 43 is separated from the computer of the present disclosure, the user can still use the voice recorder 43 in a stand-alone mode.

Additionally, a global position system (GPS) receiver 46 is connected to the I/O port 42 to sense the physical position of the user. The GPS receiver 46 senses positional data from a constellation of 24 satellites orbiting around the earth such that four satellites are visible at a time. The GPS receiver 46 provides a stream of data to the processor 20 which includes latitude, longitude, elevation and time information. The GPS receiver 46 is available from a number of sources, including NavTech Corporation and Rockwell International Corporation.

Furthermore, a wand or a bar-code reader 48 can be removably attached to the I/O port 43 to allow the data management computer of the present disclosure to read bar codes. The wand is a pen-type of scanner that requires physical contact with the bar code when scanning. In contrast, a laser bar code scanner is a non-contact scanner which uses a laser beam to read a bar code. Due to the active laser power, the laser bar code scanner is better at reading bar codes from a distance or when the bar code itself is poorly printed. The bar code reader 48 is snappably attached to the I/O port 31 such that the barcode reader 48 can be quickly attached and removed, as necessary. The barcode reader 48 captures the bar-code information from a barcoded label and converts the optically encoded information to serial data before they are transmitted to the computer of FIG. 1. Alternatively, the present disclosure contemplates that the wired link can be replaced by a wireless link such as radio or infrared. In such instances, the barcode reader 48 has an additional transceiver, which may be either radio-based or infrared based, and which can transmit captured data to the computer of FIG. 1 for subsequent processing.

Additionally, an infrared transceiver 49 can be connected directly to the bus of the computer 10 or to the I/O port 42 (not shown) to provide an infrared link to a nearby personal computer which is equipped with a corresponding infrared transceiver. The infrared transceiver 49 is available from suppliers such as Hewlett-Packard, IBM, or Siemens. In the event that the IR transceiver 49 is directly connected to the bus of the computer system 10, the transceiver 49 provides the received optical data to a Universal Asynchronous Transmitter/Receiver (UART) which converts the data into a suitable format for the bus.

Additionally, to improve the ease of reading from the small screen 35 of the computer of the present disclosure, a remote, large display device 52 is wirelessly linked to the computer 10 via the IR transceiver 49 or a radio transceiver 31. The large display device 52 can be a suitably equipped television receiver with a wireless link and a video generator, as discussed further in FIG. 3, or it can simply be the display of a conventional personal computer having a matching transceiver. The large display device 52 thus enlarges the characters on to an easier to read display. Additionally, the large display device 52 can offer higher resolution than available through the LCD display 35. In such case, the computer 10 is suitably informed so that software running on the computer 10 can change its display interface to take advantage of the higher resolution, as discussed in the previously incorporated by reference U.S. patent application entitled "DATA MANAGEMENT SYSTEM."

In addition to the large display device 52, the present disclosure also supports remote stereo amplifier 93 and speakers 94 and 95 to provide a total multimedia experience to the user, even if the hand-held computer 10 cannot support high power amplifiers and speakers on-board. In the remote stereo 93, a receiver is provided to receive data transmission from either the IR transceiver 49 or the wireless transceiver 31. The stereo amplifier can be a MIDI compatible synthesizer or sound module. The MIDI protocol provides an efficient format for conveying musical performance data. Due to MIDI's more efficient data storage format, only a portion of the bandwidth of the transceivers 31 and 49 need be used to transmit MIDI instruction streams. The MIDI data stream is a unidirectional asynchronous bit stream at 31.25 kbits/sec with 10 bits transmitted per byte. The remote stereo 93 in turn can consist of a MIDI sequencer, which allows MIDI data sequences to be captured, stored, edited, combined, and replayed. The recipient of the MIDI data stream is provided with a MIDI sound generator which responds to the MIDI messages by playing sounds. The present disclosure also contemplates more elaborate remote stereo MIDI setups, where the music can be composed to have different parts for different instruments. Furthermore, in this set-up, a different sound module is used to play each part. However, sound modules that are capable of playing several different parts simultaneously, or multi-timbral, can still be used. To allow realistic sounds to be reproduced, the stereo 93 drives a pair of speakers 94 and 95. In the manner discussed, the remote stereo unit 93 receives MIDI commands from the processor 20 and plays high quality sound on the speakers 94 and 95.

In addition to the handwriting recognizer previously discussed, voice recognition can be used in conjunction with and/or replace the handwriting recognizer of the present disclosure. As shown in FIG. 1, a microphone 51 is connected to an analog to digital converter (ADC) 50 which interfaces with the central processing unit (CPU) 20. Furthermore, a speech recognizer is stored in the ROM 21 and/or the RAM 22. The speech recognizer accepts the digitized speech from the ADC 50 and converts the speech into the equivalent text. As disclosed in U.S. application Ser. No. 08/461,646, filed Jun. 5, 1995, by the present inventor and hereby incorporated by reference, the user's speech signal is next presented to a voice feature extractor which extracts features using linear predictive coding, fast Fourier transform, auditory model, fractal model, wavelet model, or combinations thereof. The input speech signal is compared with word models stored in a dictionary using a template matcher, a fuzzy logic matcher, a neural network, a dynamic programming system, a hidden Markov model (HMM), or combinations thereof. The word model is stored in a dictionary with an entry for each word, each entry having word labels and a context guide. Next, a word pre-selector receives the output of the voice feature extractor and queries the dictionary to compile a list of candidate words with the most similar phonetic labels. These candidate words are presented to a syntax checker for selecting a first representative word from the candidate words, as ranked by the context guide and the grammar structure, among others. The user can accept or reject the first representative word via a voice user interface. If rejected, the voice user interface presents the next likely word selected from the candidate words. If all the candidates are rejected by the user or if the word does not exist in the dictionary, the system can generate a predicted word based on the labels. Finally, the voice recognizer also allows the user to manually enter the word or spell the word out for the system. In this manner, a robust and efficient human-machine interface is provided for recognizing speaker independent, continuous speech and for converting the verbal instructions from the user into text data suitable for data management purposes.

The casing design and layout of the shell for the computer of FIG. 1 are discussed next. The case can be a rectangular plastic casing with a major opening on the top of the case to receive the LCD panel 35 and the digitizer 34. The case has a receptacle which is adapted to receive and store the pen 33. Furthermore, a plurality of push-buttons in the keypad 24 are positioned on the top side of the case. The push-buttons of the keypad 24 allow the user to invoke one or more pre-installed software on the computer of FIG. 1. Additionally, the case has an opening on the backside which is adapted to receive a connector carrying the electrical impulses to and from the I/O port 42. To electrically access the I/O port 42, a Snap-On block interlocks with the bottom of the computer, which is electrically connected to the I/O port 42. As noted above, the casing for FIG. 1 resembles the Pilot handheld computer available from Palm Computing—US Robotics.

Figure 2:
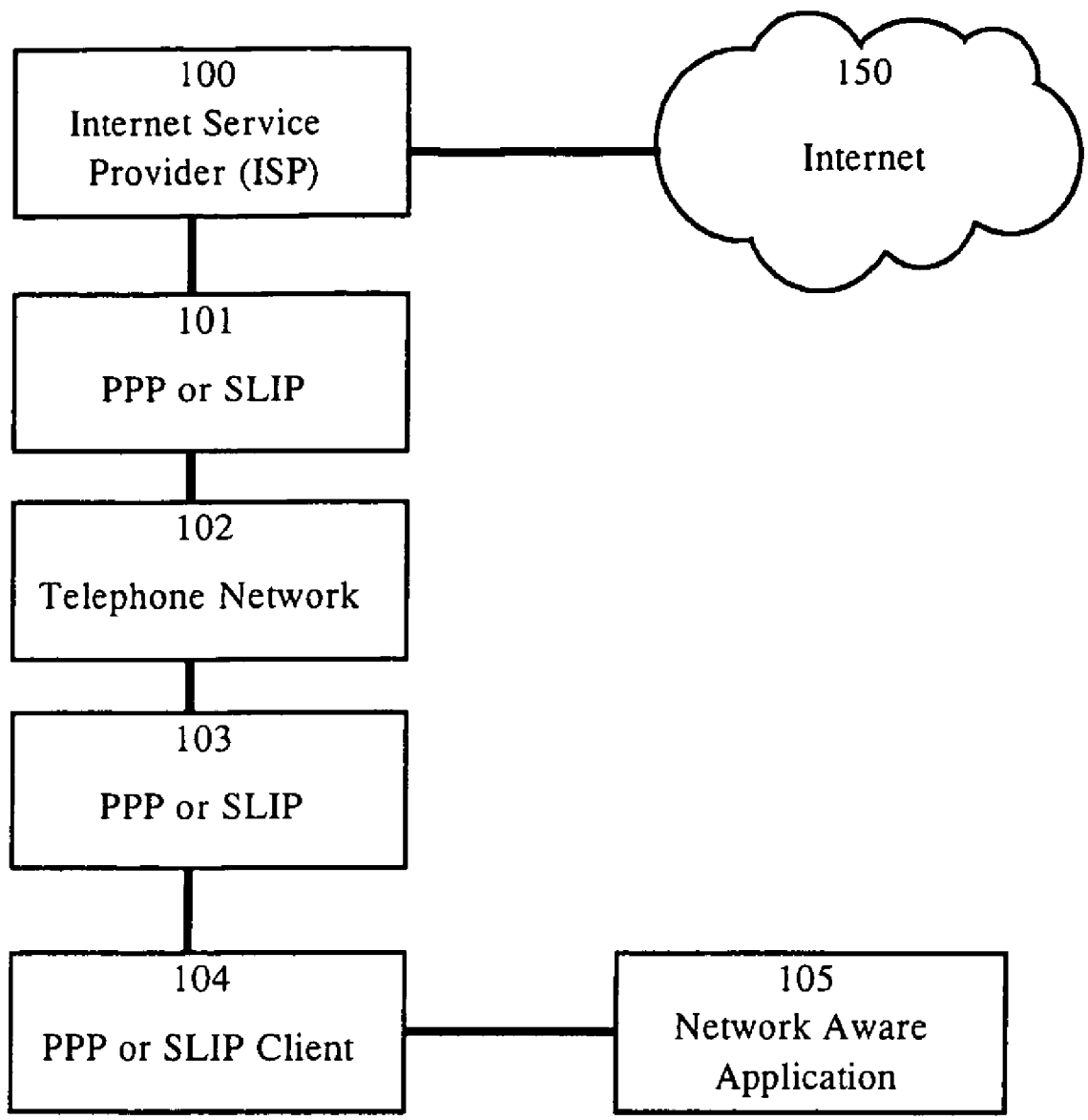
FIG. 2 shows a block diagram showing in more detail protocol layers linking a network aware application operating on the computer of FIG. 1 and another application over the Internet.

Turning now to FIG. 2, the major protocol layers for connecting the computer of FIG. 1 to a suitable network such as an Internet 150 is shown. In FIG. 2, the user connects to a suitable Internet service provider (ISP) 100 which in turn is connected to the backbone of the Internet 150, typically via a T1 or a T3 line. The ISP 100 communicates with the computer of the present disclosure via a protocol such as point to point protocol (PPP) or a serial line Internet protocol (SLIP) 101 over one or more media or telephone network 102, including landline, wireless line, or a combination thereof. On the portable computer side, a similar PPP or SLIP layer 103 is provided to communicate with the ISP 100 computer. Further, a PPP or SLIP client layer 104 communicates with the PPP or SLIP layer 103. Finally, a network aware application 105 such as a browser or a spreadsheet with Internet capability of the present disclosure receives and formats the data received over the Internet 150 in a manner suitable for the user. As discussed in more detail below, the computers communicate using the functionality provided by Hypertext Transfer Protocol (HTTP). The World Wide Web (WWW or simply the "Web") includes all the servers adhering to this standard which are accessible to clients via Uniform Resource Locators (URL's). For example, communication can be provided over a communication medium. In some embodiments, the client and server may be coupled via Serial Line Internet Protocol (SLIP) or TCP/IP connections for high-capacity communication. Active within the client computer is a "browser" which, as discussed below, establishes the connection with the server 80 (FIG. 3) and allows the user to access information via the World Wide Web.

Figure 3:
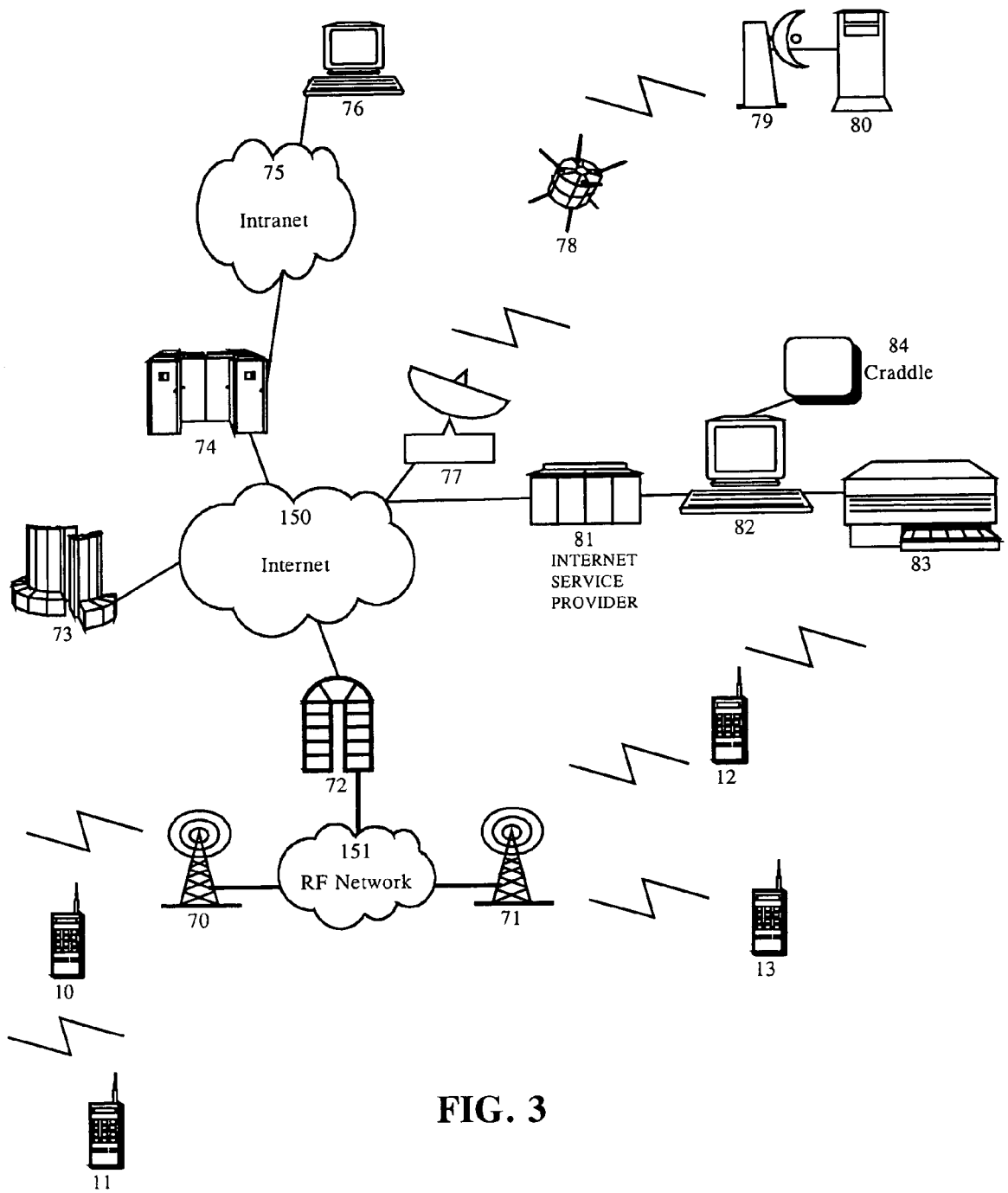
FIG. 3 is an illustration of a connectivity architecture of the computer system of FIG. 1 and the Internet as well as the data flow among computers connected to the Internet and the computer system of FIG. 1.

Turning now to FIG. 3, a typical Internet system is shown with one or more portable computers 10, 11, 12, and 13 shown dispersed in nearby cell regions. Computers 10 and 11 are located in one cell and communicate with a cell mobile support station (MSS) 70. Similarly, computers 12 and 13 communicate with a cell mobile support station 71. MSS stations 70 and 71 are connected to a radio frequency (RF) network 151 which relays the messages via stations positioned on a global basis to ensure that the user is connected to the network, regardless of his or her reference to home. The RF network 151 eventually connects to a gateway 72 which is in turn connected to the Internet 150. The gateway 72 provides routing as well as reachability information to the network such as the Internet 150. A plurality of large scale computing resources such as a supercomputer 73 and a mainframe 74 are connected to the Internet 150. The mainframe 74 in turn is connected to a corporate version of the Internet called Intranet 75 which supplies information to one or more office computers or workstations 76. A satellite link 77 is also connected to the Internet 150 to transmit IP packets via a satellite 78 to a remote station 79 which is connected to a remote server 80. Further, an Internet service provider (ISP) 81 is connected to the Internet 150. A host computer 82 is linked to the ISP 81. The host computer 82 may be a personal computer or a workstation. The host computer 82 further drives a printer 83. It is also connected to a cradle or docking station 84 which is adapted to receive one of the portable computers 10-13 to synchronize and share data amongst the machines. Via the RF network 151, the host computer 82 can also be linked tetherlessly to the portable computers 10-13.

The Internet 150 is a super-network, or a network of networks, interconnecting a number of computers together using predefined protocols to tell the computers how to locate and exchange data with one another. The primary elements of the Internet 150 are host computers that are linked by a backbone telecommunications network and communicate using one or more protocols. The most fundamental of Internet protocols is called Transmission Control Protocol/Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet 150. As packets of information travel across the Internet 150, routers throughout the network check the addresses of data packages and determine the best route to send them to their destinations. Furthermore, packets of information are detoured around non-operative computers if necessary until the information finds its way to the proper destination.

Although the Internet 150 provides a pathway for users to communicate and share information, the original user interface was rather unfriendly. Eventually, a system was developed to link documents stored on different computers on the Internet 150. Known as a World Wide Web, the system is an elaborate distributed database of documents, graphics, and other multimedia development. Like other distributed applications, the Web is based on a client/server model where Web pages reside on host computers that "serve up" pages when the user's computer (client computer) requests them. As the user "surfs" the Web, a browser can request data from the database on a server computer that processes and returns the desired data back to the computer system of FIG. 1 and to display that request when the request is fulfilled by the server. The client computer runs a browser software which asks for specific information by sending a HTTP request across the Internet 150 connection to the host computer. When the host computer receives the HTTP request, it responds by sending the data back to the client.

The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows more efficient Internet access as it saves bandwidth and improves access performance significantly. In the present disclosure, each entry in the bookmark has a list of links typically accessed by the user while he or she accesses the Web site represented by the bookmark entry. When the user clicks on the bookmark entry, the entry's Web page is displayed first. While the user is reading the page represented by the bookmark entry, the browser retrieves pages of additional links associated with the bookmark entry in the background. In this manner, the browser prefetches pages likely to be accessed by the user when the bookmark entry page is clicked, thus avoiding delays when the user actually clicks on the links of the bookmark entry Web page. The use of the cache and the prefetcher enhances the Web viewing experience, as the user is not hampered by delays on-line.

The browser also interprets HyperText Markup Language (HTML) which allows web site creators to specify a display format accessible by HTML compatible browsers. Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user. Other browsers such as the Netscape, Netcruiser, or the Lynx brand browsers, the Mosaic brand browser available from the National Center for Supercomputing Applications (NCSA) in Urbana-Champaign, Ill., or others which are available and provide the functionality specified under HTTP may be used.

To supply more intelligent processing of information over the Internet 150, a language such as Java may be utilized. Java was developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader's machine. In Java, the compiler takes the instructions and generates bytecodes, which are system independent machine codes. A bytecode interpreter executes the bytecodes. The bytecode interpreter can execute stand-alone, or in the case of applets, the bytecode interpreter is built-in Java compatible browsers. Thus, with a Java compatible client-server, the Internet 150 is transformed from a passive giant book of information into an active network capable of supporting electronic commerce and virtual ecosystems.

Although the supercomputer 73, the mainframe computer 74 and the gateway 72 are shown in FIG. 3 as being connected to the Internet 150 via landlines such as T1 and T3 lines, the Internet may be connected to a satellite transmission system which transmits and receives high bandwidth data over a satellite 78. The satellite 78 in turn relays the information to one or more local stations 79 which is connected to one or more servers 80. Thus, as shown in FIG. 3, the portable computer 10 can easily request information from a variety of sources which may exist locally or on the other side of the world via the Internet 150.

An important goal of the personal computer 10 is its ability to allow users to move about freely within and between cells while transparently maintaining all connections, particularly with the Internet 150. However, the Internet 150 suite of protocols had been designed with an assumption that each user is assigned a fixed Internet 150 address associated to a fixed location. Thus, for mobile computers with a wireless physical link, the movement or migration of users in the wireless network violates the implicit Internet 150 protocol. As wireless bandwidth is at a premium, particularly when voice and video data are involved, it is inefficient to require end-to-end retransmission of packets as done in TCP. Furthermore, due to the unpredictable movements of mobile computers with wireless links, large variations exist in the available bandwidths in each cell and affect the transmission characteristics between the mobile computer 10 and the Internet 150.

In the illustrated embodiment, a number of virtual circuits are used within the mobile network to route connections to mobile computers 10-13 via MSS 70 and 71. In the illustrated embodiment, every mobile computer 10-13 has a globally unique virtual Internet protocol (VIP) address and an LP address which is assigned by the gateway 72 or the MSS 70 or 71. Furthermore, each of the MSS 70 and 71 has a VIP as well as a fixed IP address. Each of the MSS 70 and 71 also tracks all mobile nodes within its domain or cell range. The connection from a remote endpoint on the Internet 150 to the mobile computer 10 terminates at the fixed IP of the MSS 70 or 71.

The MSS 70 and 71 maintains a cache of time-stamped VIP to IP mappings, also called an address mapping table. Whenever the mobile computer 10 moves from one MSS 70 to another MSS 71, the address mapping table is updated. During the table update, all packets destined to the mobile computer 10 continue to be sent to the old MSS 70. These packets are returned to the sender, who forwards the returned message to the new MSS 71. Thus, based on the address mapping table, the sender and the MSS 70 or 71 can route packets to the mobile computer 10.

To illustrate the operation of the VIP, events associated with the delivery of a packet of data to the mobile computer 10 are discussed next. The MSS 70 buffers the incoming packet and forwards the packet to the known or predicted cell covering the mobile computer 10. Once received, the mobile computer 10 acknowledges receipt and requests the MSS 70 to discard the packet. Alternatively, in the event that the mobile computer 10 has moved to another cell which is covered by the MSS 71, it is assigned a new IP address. The mobile computer 10 sends the new IP address and the VIP address to its home gateway 72, which in turn sends the new IP address to intermediate gateways to update their address mapping tables as well. The MSS 70 continues to send packets to the mobile computer 10 until either the connections are closed or until the MSS 71 sets up its own connection via the address mapping table with the remote endpoint having the open connection with the mobile computer 10.

To address the problems associated with bandwidth variations caused by the wireless environment, the MSS 70 or 71 can provide a loss profile transport sub-layer which determines the appropriate disposition of the data, based on markers placed on the packet by the sender and based on the available bandwidth negotiated between the MSS 70 and 71 and the mobile computers 10, 11, 12 or 13. Typically, redundant non-critical data such as every other frame of a video clip may be appropriately edited by rearranging, clipping or compressing the data at the MSS 70 or 71 end before transmitting to the mobile computer 10, 11, 12 or 13 in the event that the bandwidth is severely constrained.

Figure 4:
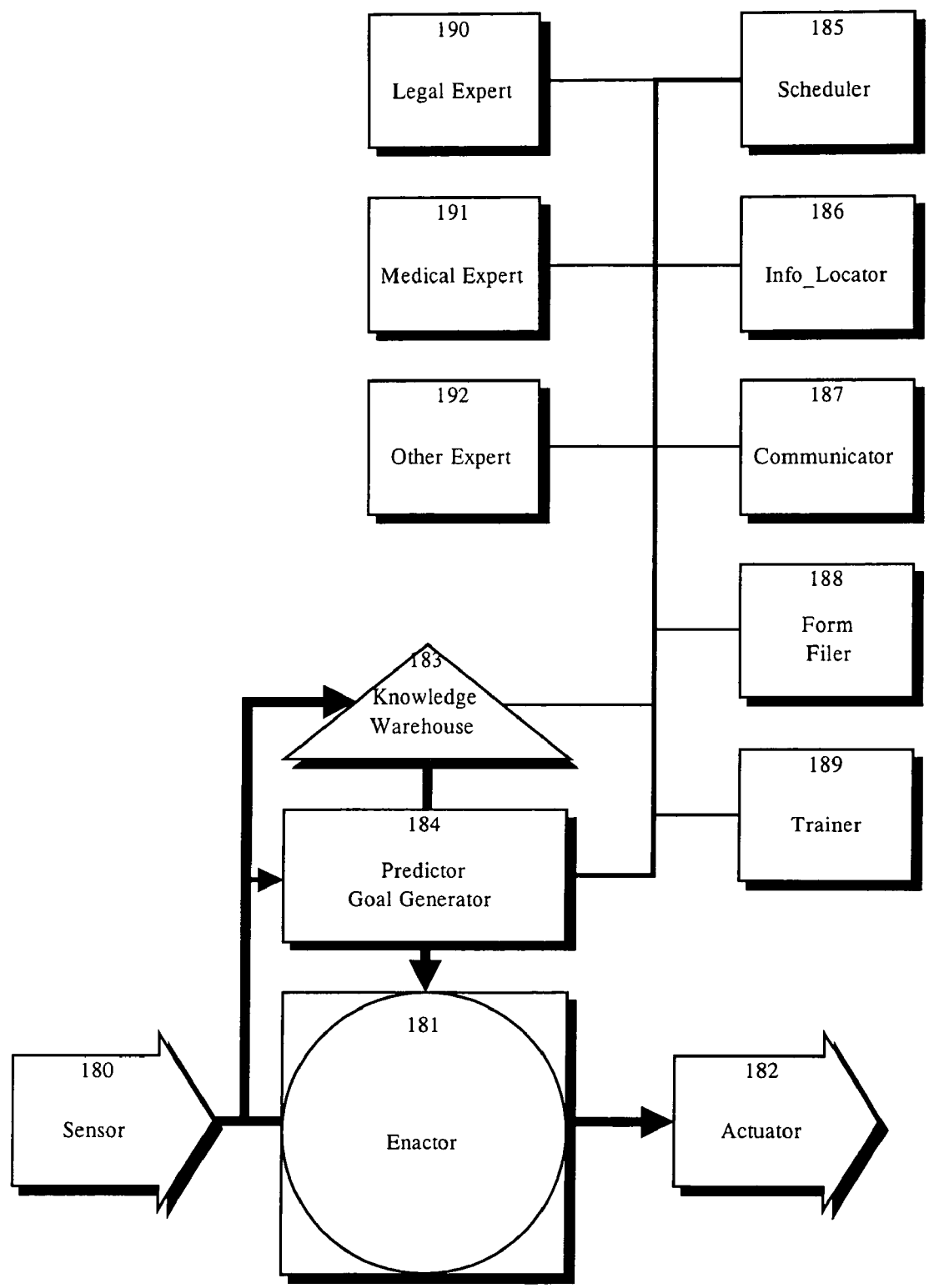
FIG. 4 is a block diagram of the electronic assistant in accordance with the present disclosure.

Turning now to FIG. 4, the intelligent interface agent of the present disclosure is illustrated in more detail. In FIG. 4, one or more sensors 180 receives incoming information. The sensors 180 in turn transfer the data to an enactor 181. The enactor 181 in turn makes a decision based on its current situational data, as captured by sensors 180. The enactor 181 then drives an actuator 182. In addition to receiving data from the sensor 180, the enactor 181 also receives instruction from a predictor/goal generator 184, which in turn is connected to a general knowledge warehouse 183. The external data sensed by the sensor 180 is also delivered to both the warehouse 183 and the predictor/goal generator 184. Additionally, both the warehouse 183 and the predictor/goal generator 184 are connected to a plurality of specialist knowledge modules, including a scheduler 185, an information locator 186, a communicator 187, a form filler 188, a trainer 189, a legal expert 190, a medical expert 191 and additional experts 192.

The knowledge warehouse 183 has a representation for the user's world, including the environment, the kind of relations the user has, his interests, his past history with respect to the retrieved documents, among others. Additionally, the knowledge warehouse 183 stores data relating to the external world in a direct or indirect manner to enable to obtain what the assistant needs or who can help the electronic assistant. Further, the knowledge warehouse 183 is aware of available specialist knowledge modules and their capabilities since it coordinates a number of specialist modules and knows what tasks they can accomplish, what resources they need and their availability.

The scheduler 185 ensures that requested events do not overlap in the event that a user appointment is being requested and that search events with approaching deadlines are provided appropriate resources and prioritization to accomplish the objective of the search. The information locator 186 has knowledge of the user's preferences, as well as outstanding requests for information on certain topics. It periodically scans appropriate databases, and delivers summaries on a scheduled or on-request basis. The communicator 187 interacts with electronic mails or requests for information. It knows the user's preferences and optimizes the presentation of e-mails in accordance with the user's prioritization pattern. Further, in the event of requests for information, in the event that the requester has appropriate authorization, the electronic assistant of FIG. 4 provides the information after consulting with the user about the appropriateness of such action. The form filler 188 knows the user's data entry pattern and fills in the form with predicted information to minimize data entry on the part of the user for repetitive forms. The legal expert module 190 provides legal support for the user, while the medical expert monitors the health condition of the user. Additional experts 192 provide specialist knowledge for specific fields of interest. The trainer 189 provides custom training to the electronic assistant so that it can handle additional tasks not already supported by the modules 185-188 and 190-192. Additionally, although not shown, the present disclosure contemplates that a refresher module may be present to provide the user with additional views which may or may not be pressing for the moment. The refresher module provides unplanned interruptions and information received during the day to provide the user with additional perspectives. For example, the refresher module includes in the batch of information delivered to the user a quantity of non-requested information which might help the user arrive at solutions to other problems in addition to those scheduled by the scheduler. The operation of each of these modules is detailed below.

Figure 5:
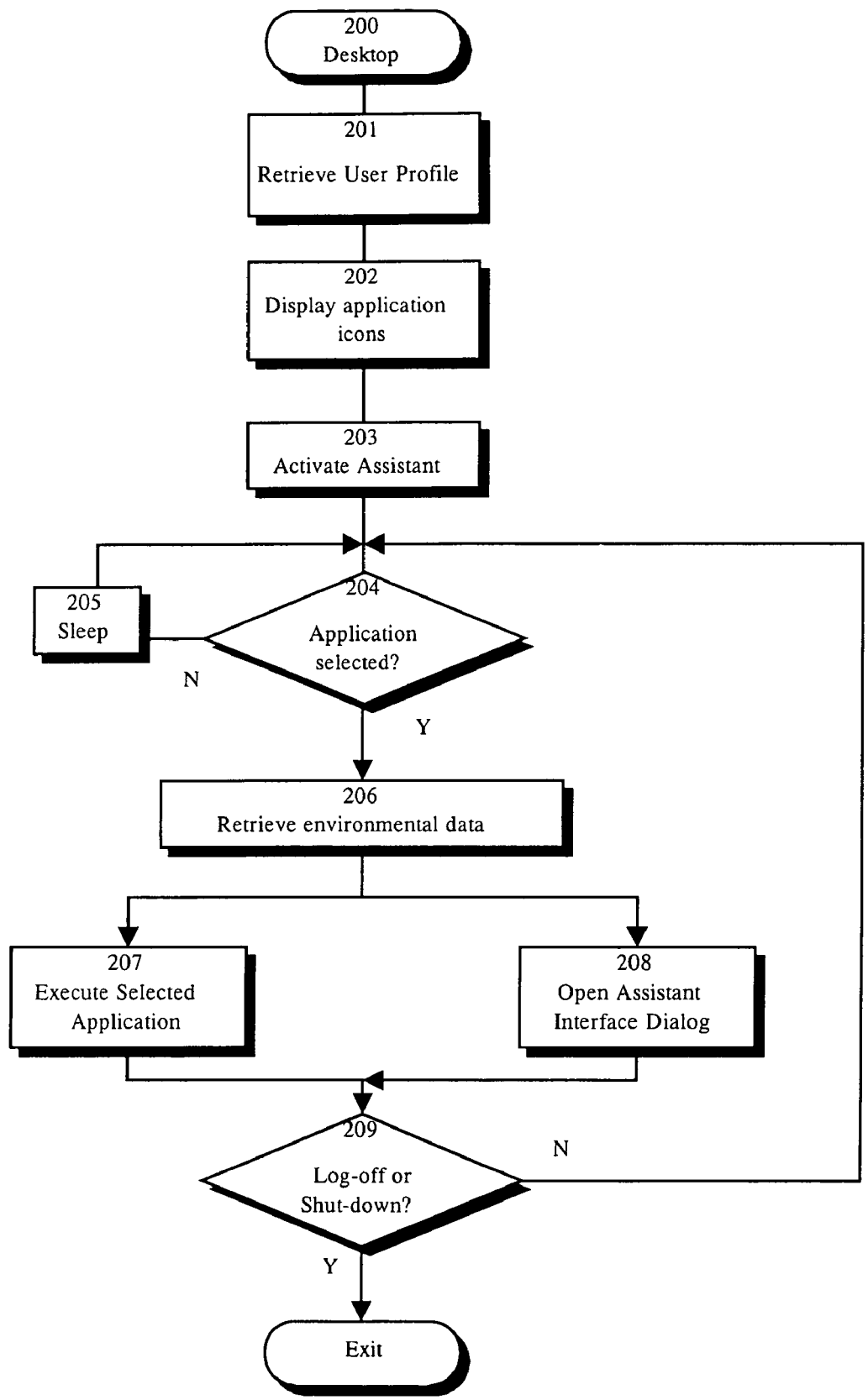
FIG. 5 is a flowchart illustrating the desktop interface of the electronic assistant of FIG. 4.

FIG. 5 is a flowchart illustrating the operational steps of the intelligent assistant of FIG. 4 on the desktop of the computer of FIG. 1. In FIG. 5, upon powering up or log-on from step 200, the routine proceeds to step 201 where it retrieves a previously stored user profile. Next, the routine of FIG. 5 displays one or more application icons in step 202. From step 202, the routine activates the assistant of FIG. 4 in step 203. Next, the routine waits for one of the applications on the computer of FIG. 1 to be selected. If no application is selected, the routine simply puts itself to sleep in step 205 so that other background processes can be executed more efficiently. From step 205, the routine of FIG. 5 periodically wakes up and checks for the activation of an application that it needs to handle.

In the event of the activation of an application in step 204, the routine of FIG. 5 proceeds to step 206 where it retrieves the environmental data such as the type of application being executed, the time of execution, other outstanding applications and data coming from the sensor 180. Once the environment has been assessed in step 206, the routine executes the selected application in step 207 and also opens an assistant interface dialog in step 208. The assistant interface dialog of step 208 displays information which may help the user in remembering prior events that are associated with the application.

Once the application completes its operation in step 207, the routine proceeds to step 209 where it checks if the user is logging-off or if a shutdown is about to occur. If not, the routine of FIG. 5 loops back to step 204 where it awaits the next application to be launched. Alternatively, in the event of a log-off or power down, the routine of FIG. 5 exits.

Figure 6:
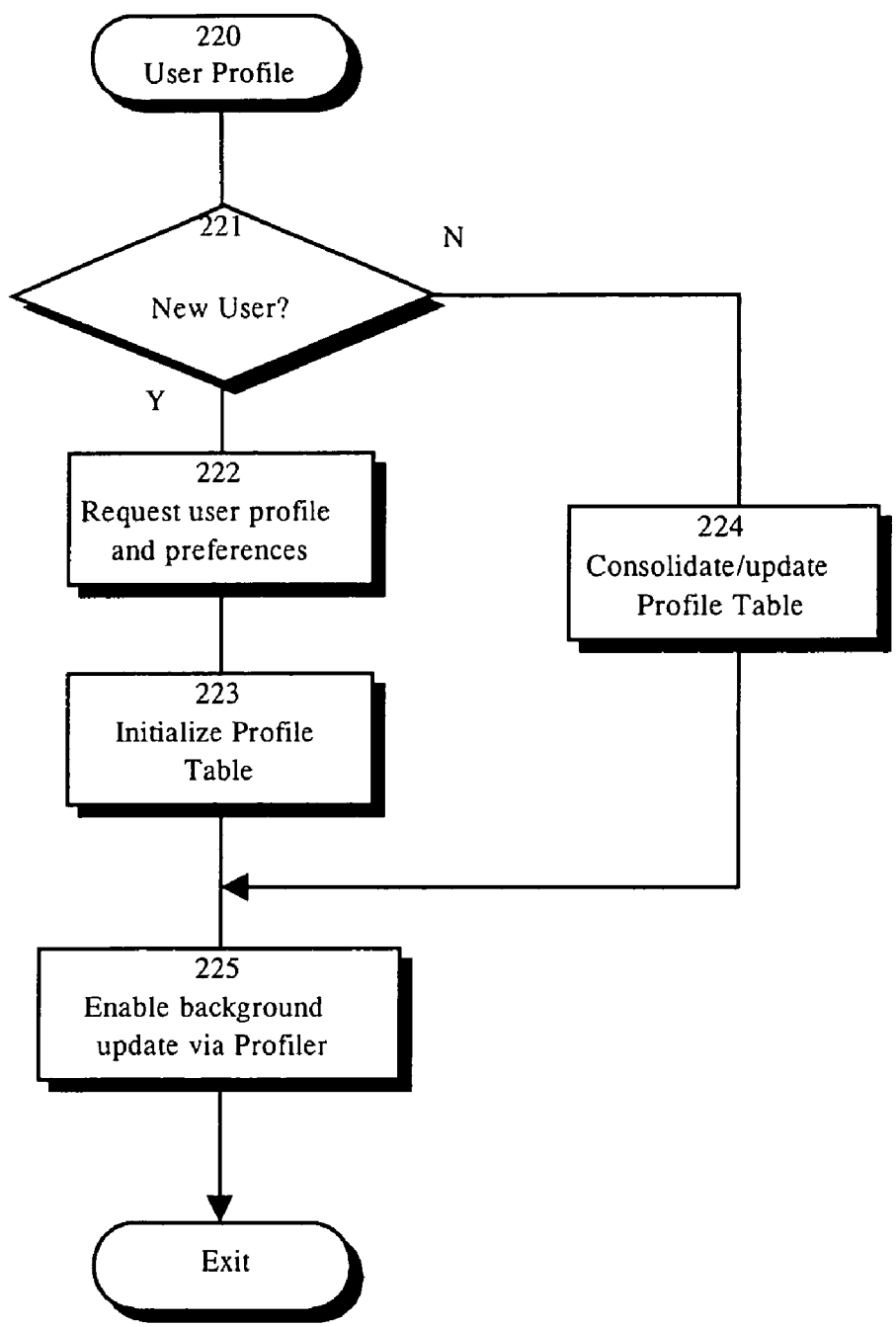
FIG. 6 is a flowchart illustrating the process of capturing a user profile by the electronic assistant of FIG. 4.

FIG. 6 is a flowchart illustrating the process of capturing a user profile which is retrieved in step 201 of FIG. 5. The user can provide his or her profile to the assistant during his or her first session. Turning now to FIG. 6, upon entering in step 220, the routine proceeds to step 221 where it checks for a new user. If so, the routine proceeds from step 221 to step 222 where it request the user to enter his or her profile and preferences. The user can set different profiles each reflecting an interest area. Among the different preferences, the user can select the types of archives he is interested in, e.g., ftp, gopher, wais, among others. He can also set a personal list containing the sites in which documents of user's interest are found more frequently. From step 222, the routine then initializes a profile table in step 223.

In the event that the user is an existing user in step 221, the routine proceeds to step 224 where it consolidates and updates the user profile table. Next, from step 223 or 224, the routine proceeds to step 225 where it enables a background capture of user characteristics via a profiler. The profiler transparently captures the user activities, and based on the actions taken as well as the time taken to perform the action, allows the electronic assistant of FIG. 4 to predict next user actions based on past observations and hypothesis. Once the background capture has been started, the routine of FIG. 6 exits. In this manner, the assistant keeps tracks of the evolution of the user's interests by maintaining a dynamic profile that takes the user's behavior into account. The specificity of the profile increases with the user's awareness about the available information and how to get it. The possibility of a relevance feedback is particularly important in the context of the final system. Using the user's profile, the assistant can in turn launch specialized agents to navigate through the network hunting for information of interest for the user. In this way, the user can be alerted when new data that can concern his interest areas appear.

Figure 7:
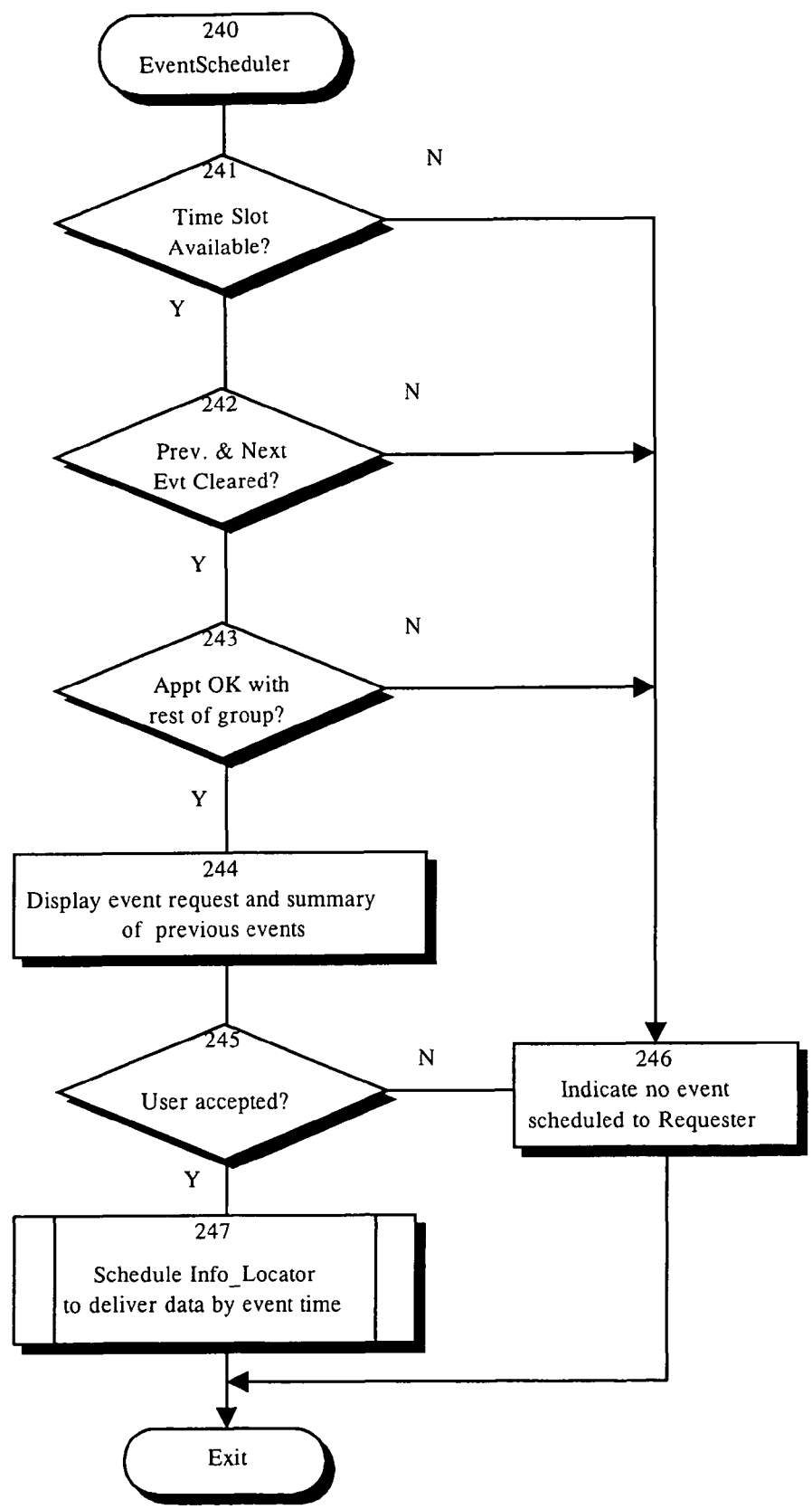
FIG. 7 is a flowchart detailing the operation of a scheduler of FIG. 4.

FIG. 7 is a flowchart detailing the operation of the event scheduler of FIG. 4. Upon entry to the process in step 240, the routine of FIG. 7 checks if a time slot is available. If so, the routine proceeds to step 242 where it clears the requested event time such as a meeting time with the end-time of the previous event and start time of the next event. In step 243, in the event that the event is a group appointment, the routine of FIG. 7 checks if the requested appointment event is acceptable to the remaining members of the group. From step 241, 242, or 243, in the event that the result is negative, the routine proceeds to step 246 where it indicates to the requester that no event has been scheduled due to one or more conflicts. Alternatively, if all conditions are acceptable, the routine of FIG. 7 proceeds from step 243 to step 244 where it displays the event request to the user. Further, the routine displays the summary of the previous events or meeting to the user to jog his or her memory. From step 244, the routine proceeds to step 245 where it checks if the user approves the event scheduling. If not, the routine moves to step 246 where it indicates no event has been scheduled to the requester. Alternatively, if the user accepts, the routine of FIG. 7 proceeds to step 247 where it schedules the information locator to retrieve relevant data by the specified event deadline. From step 246 or 247, the routine of FIG. 7 exits.

Figure 8:
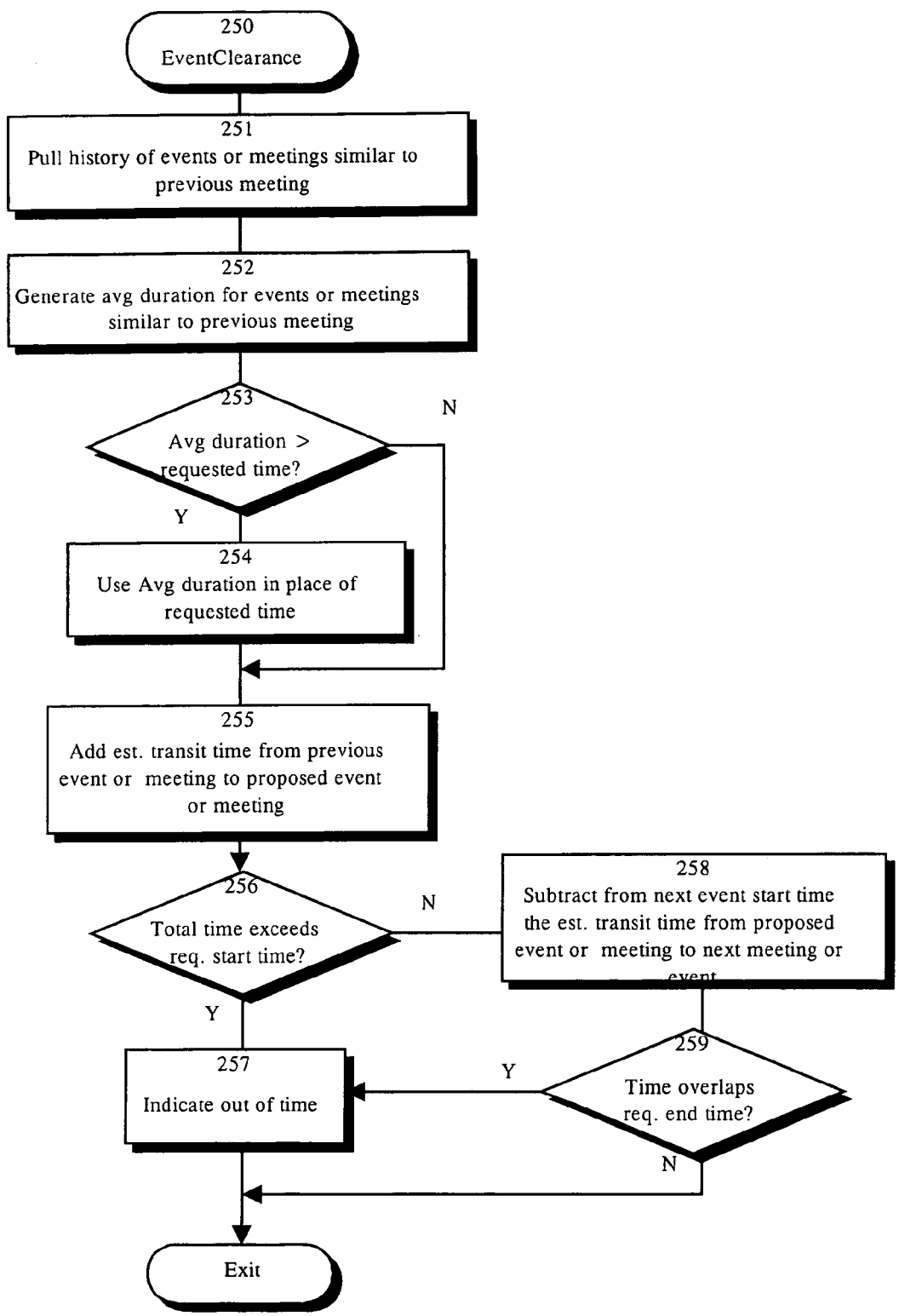
FIG. 8 is a flowchart of the process for ensuring that the event requested in FIG. 7 clears previous and next event times.

FIG. 8 is a flowchart showing the process of ensuring that the requested event clears both previous and next event deadlines. From step 250, the routine pulls a history of meetings or events similar to the previous meeting to derive an expected event duration in step 251. Next, in step 252, the routine generates an average duration of the meetings or events similar to the event previous to the requested event. From step 252, the routine of FIG. 8 checks if the average duration, when added to the initial time of the previous event, exceeds the requested time slot in step 253. If so, the routine uses the computed average duration in place of the time allocated for the previous meeting or event in step 254. In this manner, the routine of FIG. 8 compensates for optimistic time allocation associated with the previous event by the user or the requester of the previous event.

Next, from step 253 or 254, the routine proceeds to step 255 where it adds an estimated transit time from the previous event to the location of the requested event or meeting. Thus, step 255 accounts for delays associated with switching from the previous event to the requested event or, in case of the user calendar, accounts for delays associated with the travel time from the location of the previous meeting to the location of the proposed meeting. Next, in step 256, if the total time exceeds the requested starting time for the proposed meeting or event, the routine of FIG. 8 proceeds to step 257 where it notifies the requester of the timing or logistics problem in setting the meeting or scheduling the event. Alternatively, in the event that the timing or logistics issues between the previously scheduled event and the proposed event do not pose a problem, the routine of FIG. 8 checks for potential time conflicts with the next scheduled event in step 258. In this step, it subtracts from the start time of the next event or meeting the transit time in the event of a meeting, or the task switching delay associated with the events. Next, in step 259, the routine of FIG. 8 checks if the subtracted time overlaps into the time requested for the proposed meeting or event. If so, the routine proceeds to step 257 where it indicates an error. Alternatively, in the event that both the previous and next meeting or event clear the timing analysis of FIG. 8, the routine exits without an error flag or message.

Figure 9:
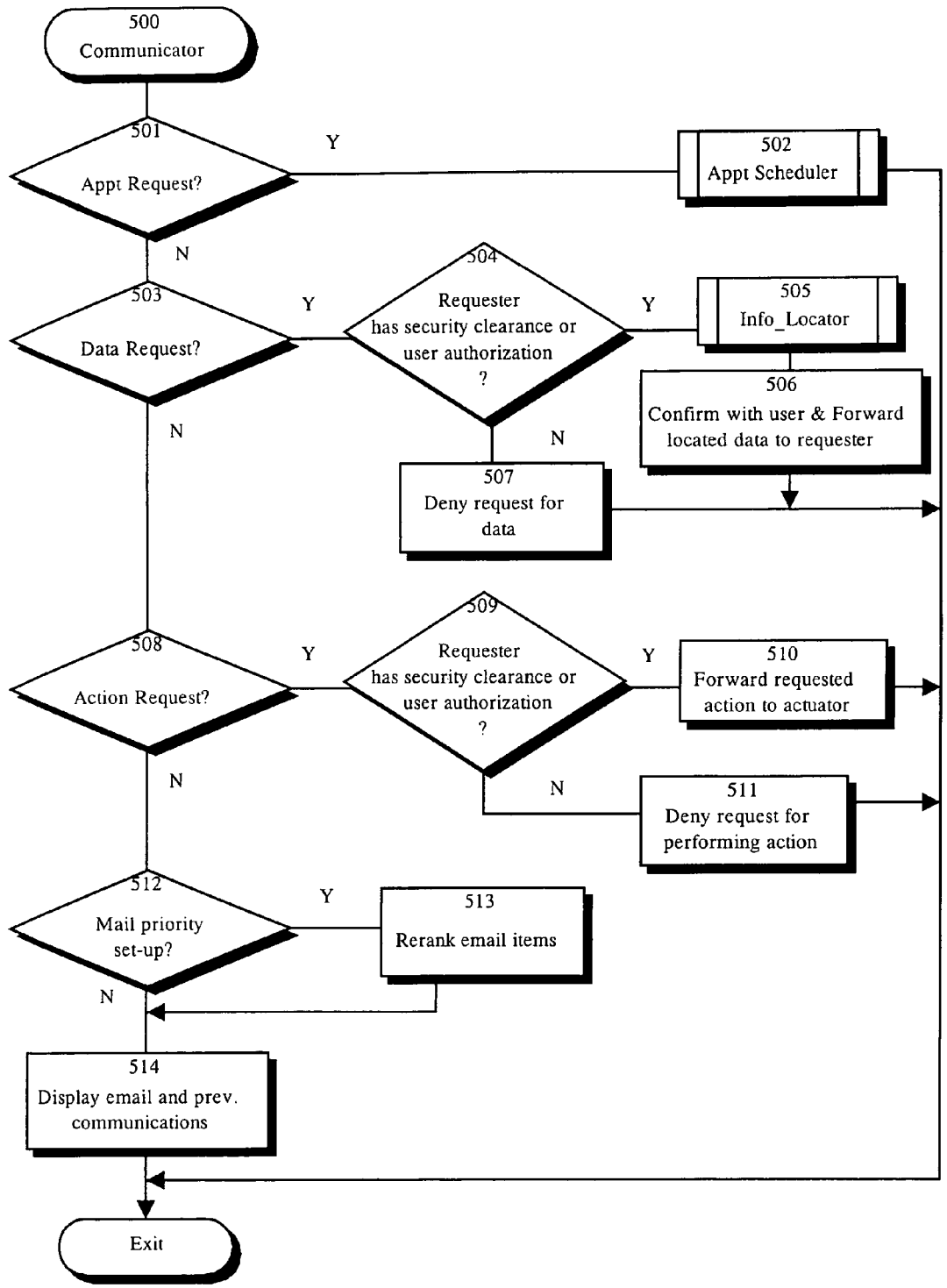
FIG. 9 is a flowchart illustrating the process of responding to external communications and information request.

FIG. 9 is a flowchart illustrating the process of responding to external communications and request. In FIG. 9, the routine checks if the incoming request is an appointment request in step 501. If so, it invokes the scheduler in step 502 to indicate that a meeting is to be scheduled before exiting. As discussed above, the scheduler may or may not accept the appointment, based on its timing analysis and also based on the user preference.

From step 501, if the request is not for an appointment, the routine moves to step 503 where it checks if the request is for data. If so, the routine checks in step 504 whether the requester has appropriate security clearance or user authorization. If so, the routine proceeds to step 505 where it invokes the information locator to retrieve the requested information. Next, in step 506, the routine quickly prompts the user for approval before sending the located data to the requester. From step 504, in the event that the user lacks appropriate authorization, the routine of FIG. 9 denies the request for information with a reason for its action.

From step 503, if the request is not for data, the routine of FIG. 9 checks if the requester is requiring one or more actions, such as the execution of particular software or the enabling/disabling of certain hardware under the control of the user. If so, the routine checks in step 509 the security classification of the user. If the user has the appropriate authorization, the routine proceeds from step 509 to step 510 where it informs the user of the requested action and the proposed response. If the user does not object, the assistant then forwards the requested action to the actuator 182 for carrying out the requested action. Alternatively, if the requester lacks authorization or if the user disapproves of the request, the routine denies the request in step 511. From step 510 or 511, the routine exits.

From step 508, the routine then prioritizes the incoming mail for the user. If the user has explicitly set up a mail priority system or implicitly set up the priority system as evidenced by his or her inspection of incoming mail in step 512, the routine moves from step 512 to step 513 where it ranks the incoming electronic mails (emails) in satisfaction of the mail priority designated by the user. From step 512 or 513, the routine of FIG. 9 displays the emails as well as previous communications associated with the emails to augment the user's recall of events associated with the email.

Figure 10:
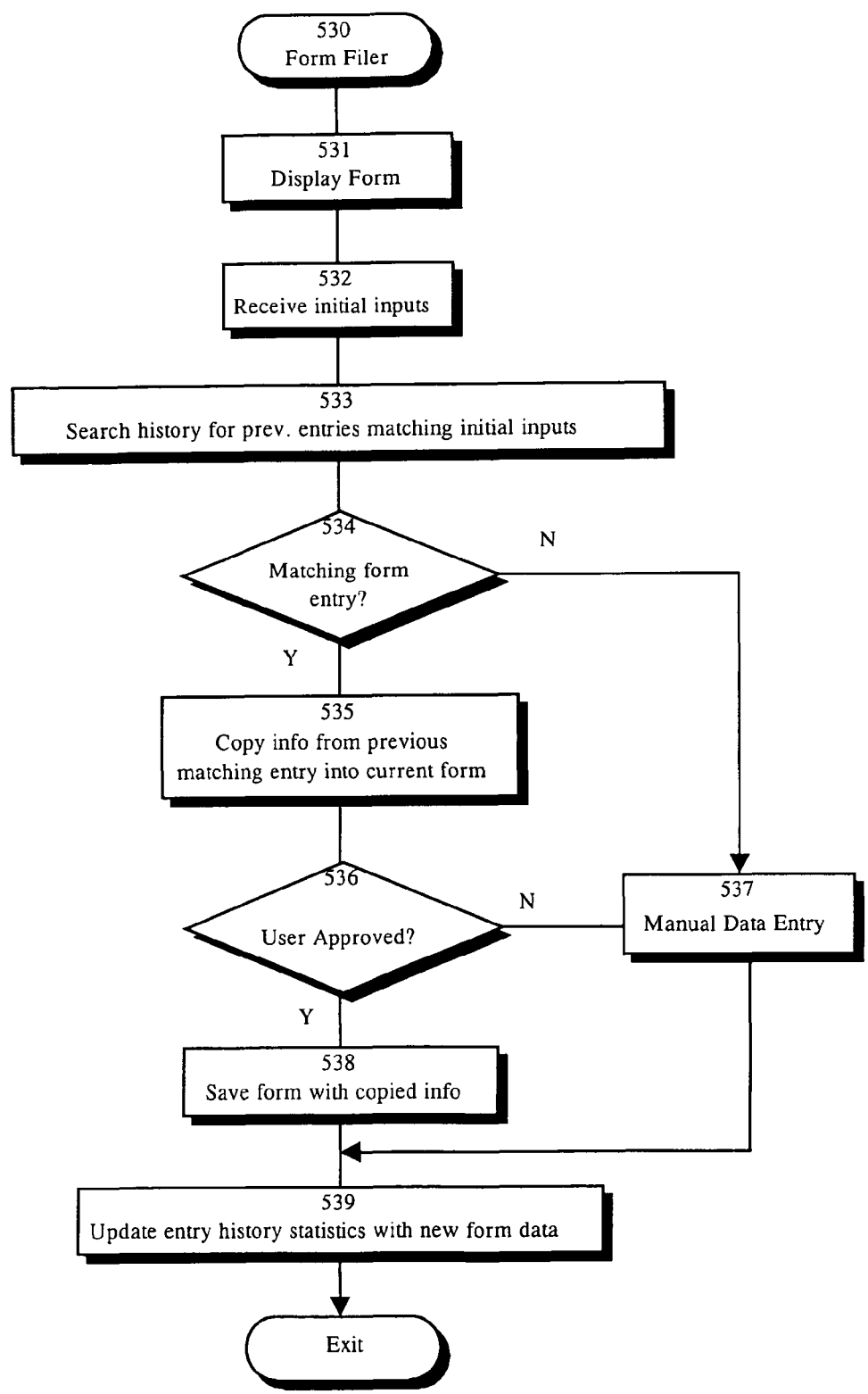
FIG. 10 is a flowchart illustrating the operation of a form filler of FIG. 4.

FIG. 10 is a flowchart illustrating the operation of the form filler of FIG. 4. The form filler 188 provides automatic form filling capability to simplify the user's completion of repetitive forms. The form filler 188 examines initial data entries in data fields of the present form, and if a matching pattern exists, the form filler 188 generates predicted field values and enters the proposed values into the form for the user to approve. Alternatively, in the event that no matching pattern is available, the form filler 188 enters a learning mode where it captures the relationship of the newly entered data for future applications. As shown in FIG. 10, from entering the form filler in step 530, the routine proceeds to step 531 where it displays the requested form. Next, the routine proceeds to step 532 where it receives initial data inputs from the user. After a few entries have been entered, the routine of FIG. 10 searches in its memory bank for previous entries with similar data inputs in step 533. Next, in step 534, the routine of FIG. 10 checks if an entered form with initial entries matching the data entered in step 532. If a matching set of entries exist, the routine proceeds from step 534 to step 535 where it copies the content of the form with matching initial entries into the current form. If not, the routine proceeds to step 537 where it captures the rest of the data entry for the form. From step 535, the routine proceeds to step 536 where the routine awaits user approval. If the user disapproves in step 536, the routine of FIG. 10 clears the copied data before moving to step 537 to allow the user to enter new data. Alternatively, in the event that the user approves in step 536, the routine proceeds to step 538 where it saves the automatically filled in data for the user. From step 537 or 538, the routine of FIG. 10 updates the history statistics with the newly saved data to improve its next prediction before the routine exits. The learning system can use an ID4 decision tree process, as known in the art. Further, although FIG. 10 illustrates prediction of entire fields in the form, the present disclosure also contemplates the prediction of strings within a field. The string predictor predicts the complete string based on a partial entry of that string by the user and based on examples the system has already seen in that field.

Figure 11:
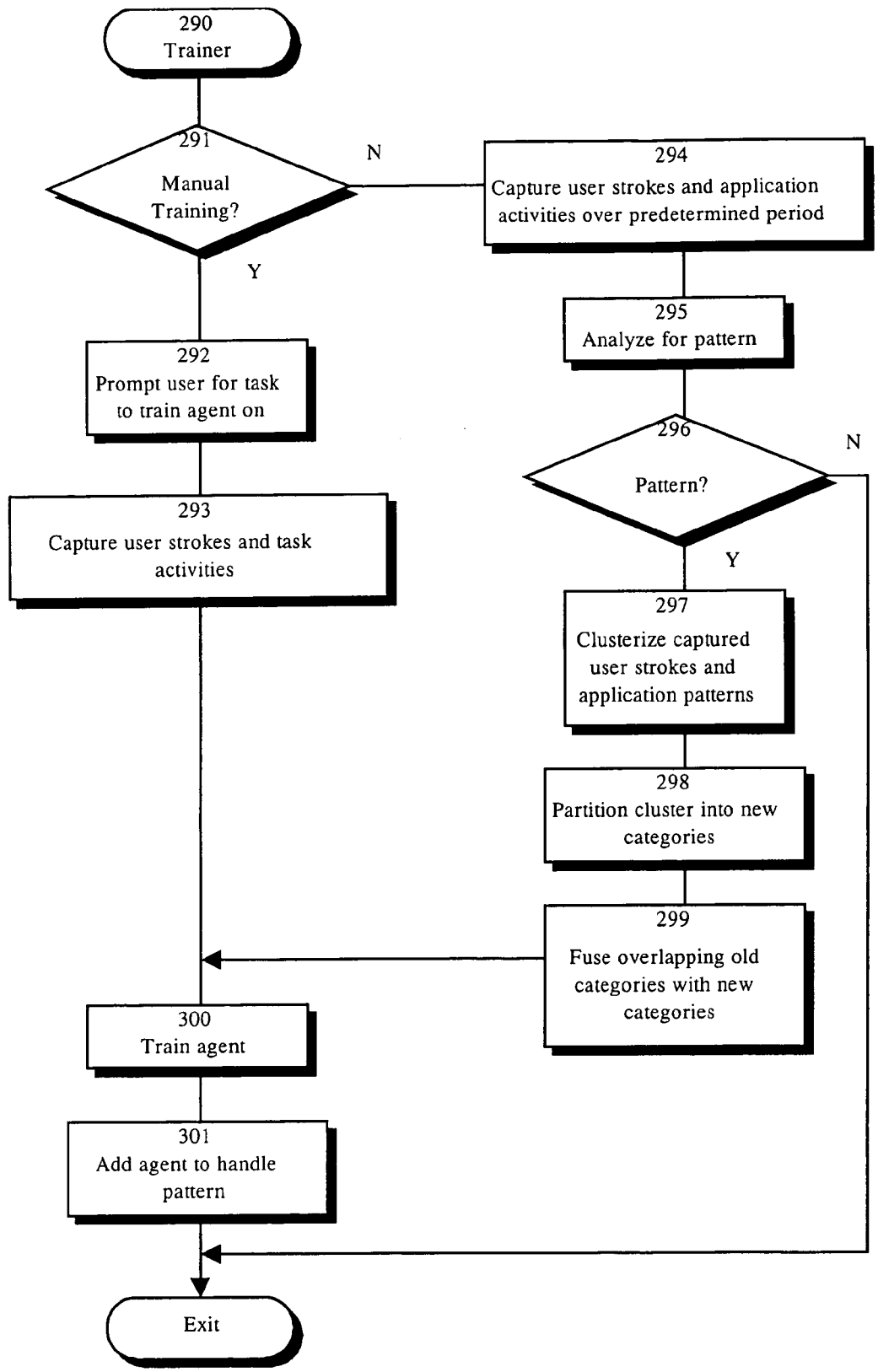
FIG. 11 is a flowchart illustrating the operation of a trainer of FIG. 4.

FIG. 11 is a flowchart illustrating the operation of the trainer of FIG. 4. From step 290, the routine of FIG. 11 proceeds to step 291 where it checks if the user wishes to manually train the intelligent assistant by providing explicit sequences to the assistant, similar to that of a macro training operation. From step 291, in the event that the user wishes to manually train the assistant, the routine proceeds to step 292 where it prompts the user for a particular task to train the assistant on. From step 292, the routine proceeds to step 293 where it captures user strokes and task activities associated with the strokes.

Alternatively, in the event that the assistant is to learn its task through inference, the routine proceeds from step 291 to step 294 where it captures the user strokes and application activities over a predetermined period. Next, the strokes and activities are analyzed for patterns in step 295. If a pattern is established in step 296, the routine of FIG. 11 proceeds to step 297 where it groups the data by clusterizing the captured user strokes and application patterns. From step 297, the routine proceeds to step 298 where it partitions the clusters into new categories. Next, in step 299, the routine fuses the new categories with existing categories.

From step 293 or step 299, the routine of FIG. 11 trains the assistant in step 300. After training, the newly trained module is added to the intelligent assistant functionality in step 301. From step 301, or from step 296, the routine of FIG. 11 exits.

Figure 12:
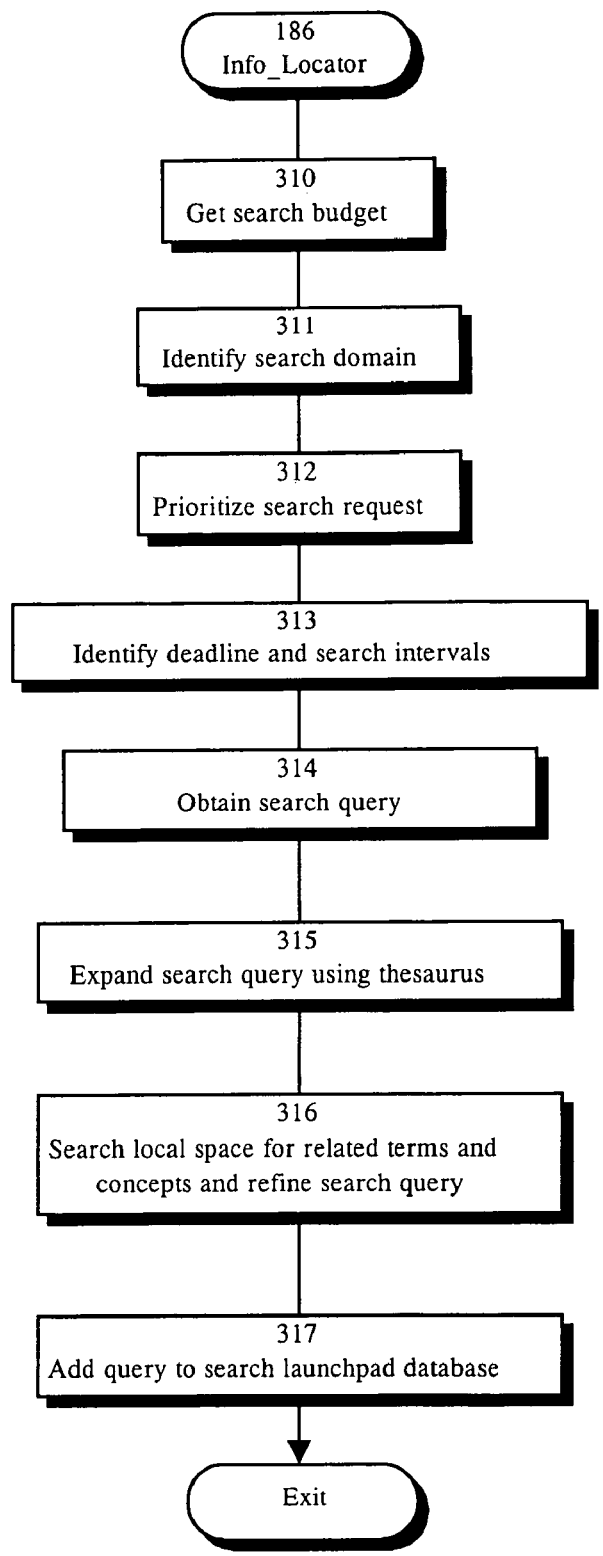
FIG. 12 is a flowchart illustrating the operation of an information locator of FIG. 4.

Turning now to FIG. 12, the process for operating the information locator is detailed. In FIG. 12, the routine proceeds to step 310 where it requests a search budget from the user. The budget may be monetary or may be time spent performing the search. Next, the routine requests that the user identify the search domain in step 311. The suggested search domain, based on prior user history and preference, may be displayed on the screen for the user to approve. From step 311, the routine requests that the user prioritize the search request relative to outstanding requests. The suggested prioritization of the search, based on prior user history and preference, may be displayed on the screen for the user to approve. In step 313, the deadline and search intervals are identified.

From step 313, the electronic assistant of the present disclosure generates a search query in step 314 based on a general discussion of the search topic by the user. The assistant then refines the search query in steps 315-316 where it expands the search query using a thesaurus to add related terms and concepts. Further, the assistant searches the computer's local disk space for related terms and concepts, as terms and concepts in the user's personal work space are relevant to the search request. In this manner, based on its knowledge of the user's particular styles, techniques, preferences or interests, the information locator can tailor the query to maximize the search net. Next, the routine proceeds to step 317 where it adds the query to the search launchpad database which tracks all outstanding search requests. From step 317, the information locator broadcasts the query to one or more information sources and awaits search results. Upon receipt of the search results, the information locator communicates the results to the user, and updates the knowledge warehouse 183 with responses from the user to the results.

In this manner, the information locator of FIG. 12 presents a list of keywords in the search which identifies a possible set of documents for which the user can choose a particular action. Then he can specify the number of items he wants and if there is a time in which he prefers to activate the search. The retrieved documents are shown to the user according to the preference values in the current profile. The assistant tracks the user's behavior concerning the documents retrieved in both surfing and query modes. After each search cycle in the surfing mode, the retrieved documents are proposed to the user who can decide to refuse or accept each of them. The rejected documents are stored in a database and successively compared with the sets of incoming documents in order to refine the boundaries of the search. Thus, if items in the incoming set are found similar to some of the rejected documents, the assistant discards the former. As a consequence the documents proposed to the user are closer to his actual interests. In the query mode, the user's requests are also used to refine the profile. The rejected documents are added to the database, while for each query a profile is extracted from the set of accepted items that the assistant adds to the profiles database.

Although the electronic assistant can reside on a single computer, the information locator can be located in either the host computer or on the handheld computer. When the assistant operates in an environment equipped with a handheld computer which is adapted to work with a host computer, the assistant splits into two personalities, one residing on the handheld computer with the intelligent desktop assistant of FIG. 5 for interacting with the user and one residing on a host computer with the information locator of FIG. 12 for executing searches in the background. When results are found, the assistant running on the host computer prioritizes the retrieved documents. Further, the assistant on the host computer transforms the data designed to be sent to the handheld computer into an equivalent file optimized for fast and robust wireless transmission. The assistant then immediately transmits the transformed, high priority documents to the handheld computer through a wireless modem while withholding lower priority documents for transfer when the handheld computer docks with the host computer to minimize data transmission costs. Further, upon docking, the assistant on the handheld computer synchronizes its knowledge base with the assistant running on the host computer to ensure that the personalities on the handheld and host computers have consistent knowledge of their environments.

Figure 13:
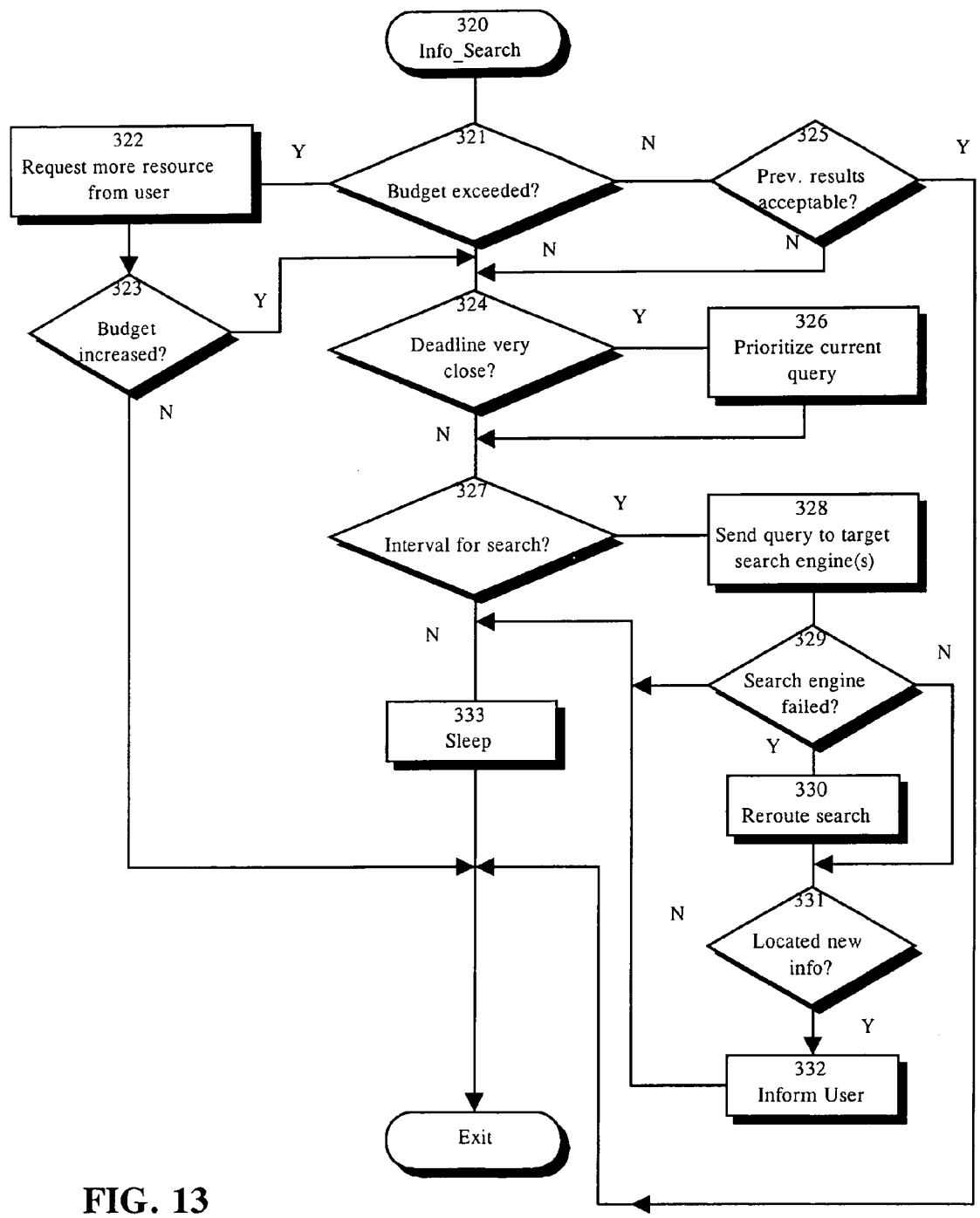
FIG. 13 is a flowchart illustrating the search process of the information locator of FIG. 11.

Turning now to FIG. 13, the process for carrying out the search is shown in more detail. From step 320, the routine proceeds to step 321 where it checks if the allocated budget is depleted. If so, the routine moves to step 322 where it requests more resources to be allocated to the search process. Next, in step 323, the routine checks if the user has increased the budget or not. If not, the routine kills the search requests and exits as it is out of resources. In this manner, the economic based competitive allocation system ensures that only worthwhile searches are performed.

In the event that the budget has not been exceeded in step 321, the routine checks in step 325 if the previous search results are good enough that no additional search needs to be made, even if the deadline and remaining budget permits such search. If so, the routine simply exits. Alternatively, in the event that the remaining budget is sufficient to cover another search, the routine moves to step 324 where it checks on the closeness of the deadline. If the deadline is very near, such as within a day or hours of the target, the routine elevates the priority of the current search in step 326 to ensure that the search is carried out in a timely fashion. From step 324 or 326, the routine checks in step 327 if it is time for an interval search, which is intermediate searches conducted periodically in satisfaction of an outstanding search request. If so, the routine proceeds from step 327 to step 328 where it sends the query to the target search engine(s).

The search tracks the intercepted URLs involving the formation of new searches cause the spawning of new search processes that will execute either through a single completion of a multiple engine search or through an indefinite number of search completions, each occurring at an interval specified by the user at the time of the initial request. Searches can be scheduled through the search engines currently available on the web such as Lycos, Web Crawler, Spider etc., at a constant interval set by the user. The assistant optionally reports to its user if a specific search is fulfilled or in progress through the inclusion of a footer to pages currently displayed on the user's browser.

Once the query has been submitted, the electronic assistant periodically checks the status of the search. In step 329, in the event that the search engine has failed for some reason, the routine of FIG. 13 reroutes the search to reach a mirror search engine in step 330 if available, or substitute a less preferred, but operational search engine. From step 329 or 330, in the event that new information has been located, the routine informs the user in step 332 such that the user is notified if a specific search has a new search result since last database retrieval. Otherwise, the routine proceeds to step 333 where it sleeps to await the next interval search.

In this manner, the assistant automatically schedules and executes multiple information retrieval tasks in accordance with the user priorities, deadlines and preferences using the scheduler. The scheduler analyzes durations, deadlines, and delays within its plan while scheduling the information retrieval tasks. The schedule is dynamically generated by incrementally building plans at multiple levels of abstraction to reach a goal. The plans are continually updated by information received from the assistant's sensors, allowing the scheduler to adjust its plan to unplanned events. When the time is ripe to perform a particular search, the assistant spawns a child process which sends a query to one or more remote database engines. Upon the receipt of search results from remote engines, the information is processed and saved in the database. The incoming information is checked against the results of prior searches. If new information is found, the assistant sends a message to the user.

Figure 14:
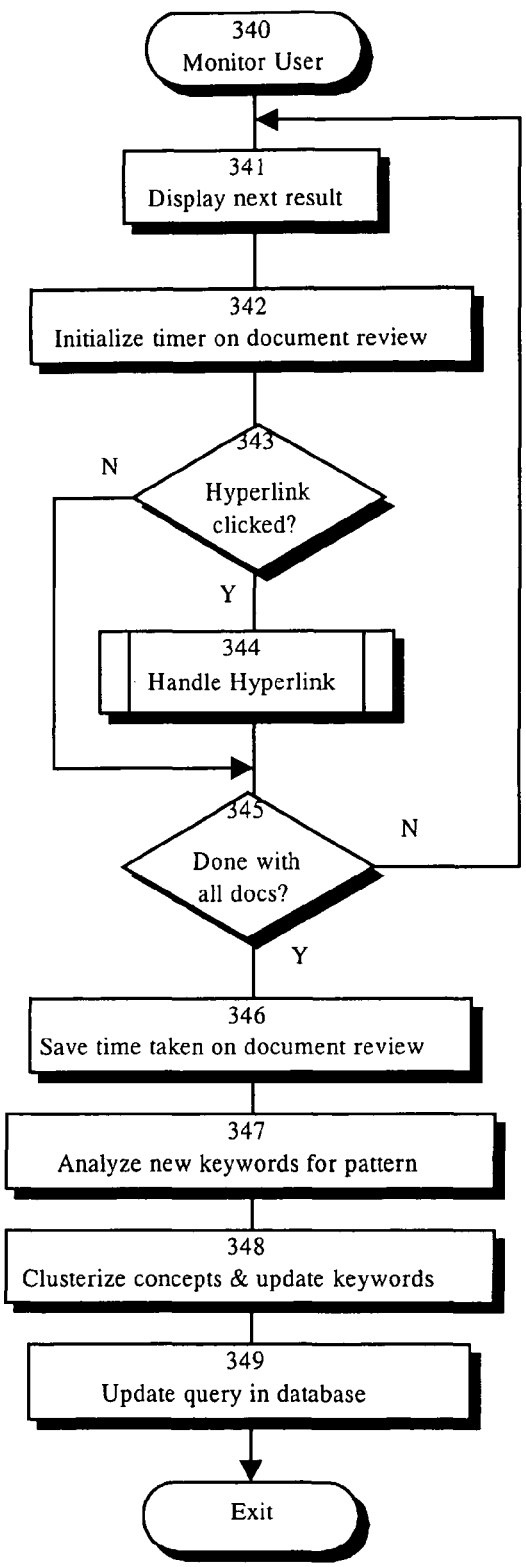
FIG. 14 is a flowchart illustrating the process for monitoring user interests in documents retrieved by the information locator of FIG. 12.

While the result of the search is displayed to the user, his or her interaction with the search result is monitored in order to sense the relevancy of the document or the user interest in such search. Turning now to FIG. 14, the routine to monitor the user interest is shown. In FIG. 14, from step 340, the routine displays the next result or document found by the information locator. Next, in step 342, a timer is initialized to track the time taken to review the document displayed in step 341. In the event that the document is an HTML page with links, the routine detects whether the user has selected one of the links in step 343. If not, the routine calls a HyperText link (hyperlink) handler in step 344. From step 344, or from step 343 if the user has not selected the Hyperlink, the routine proceeds to step 345 where it checks if the user has reviewed all relevant documents found during the search. If not, the routine loops back to step 341. Alternatively, in the event that the user has reviewed every document found during the instant search, the routine of FIG. 14 computes in step 346 the time the user spent on the entire review process, as well as the time spent on each document. Documents with greater user interest, as measured by the time spent in the document as well as the number of hypertext links from each document, are analyzed for new keywords and concepts in step 347. Next, the new keywords and concepts are clusterized using cluster procedures such as the k-means clustering procedure known in the art and the resulting new concepts are extracted in step 348. Next, in step 349, the query stored in the database is updated to cover the new concepts and keywords of interest to the user. In this manner, the procedure of FIG. 14 adapts to the user's interests and preferences on the fly so that the next interval search is more refined and focused than the previous interval search.

Figure 15:
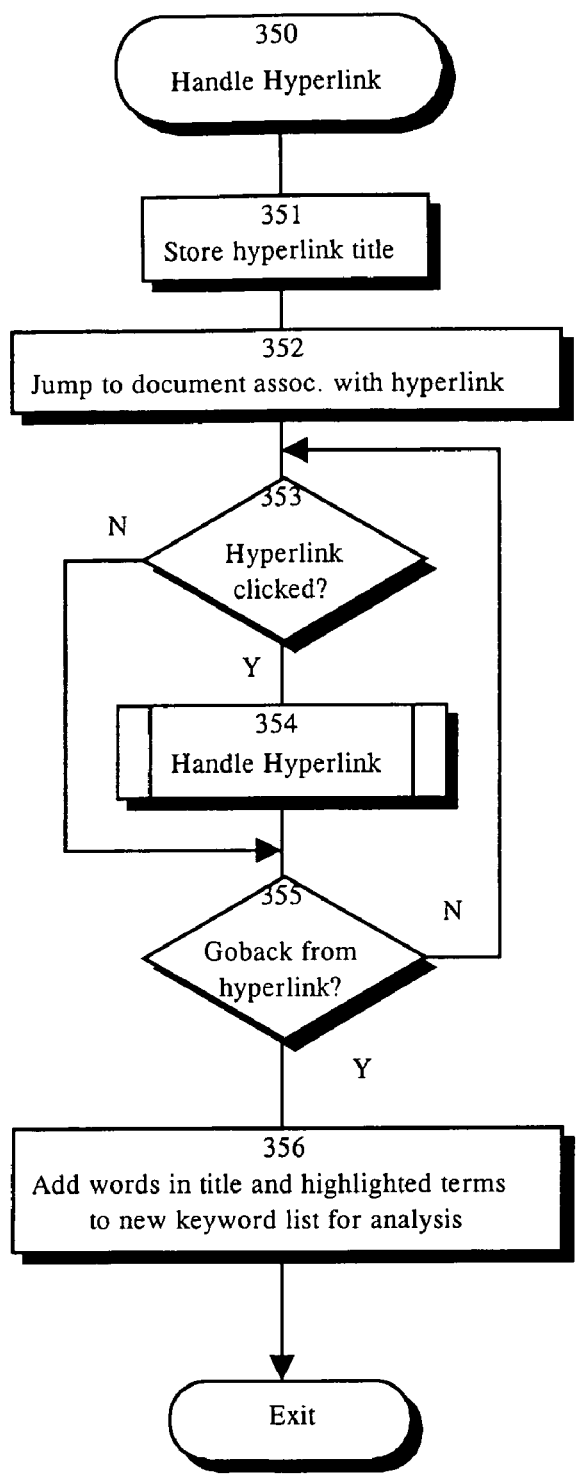
FIG. 15 is a flowchart illustrating the process for handling hyperlinks in FIG. 14.

Referring now to FIG. 15, the procedure to handle the hyperlinks of FIG. 14 is detailed. This procedure is recursive in nature such that when the user is in a document, the user can invoke further instances of the process of FIG. 14 to examine other hyperlink documents in succeeding reviews. In FIG. 15, from step 350, the routine stores the hyperlink title in the list of keywords to be clusterized, as the hyperlink title had some causal relationship to the user's decision to examine the particular hypertext link. From step 351, the routine jumps to the document pointed to by the hyperlink in step 351. Once the new document is displayed, the routine checks in step 353 whether the user has clicked the hyperlinks within the new document. If so, the routine recursively calls itself in step 354. Alternatively, the routine proceeds from step 353 to step 355 where it checks if the user has decided to go back to the parent hyperlink. If not, the routine loops back to step 353 to allow the user to continue viewing the document. Alternatively, the routine proceeds from step 355 to step 356 where the keywords in the title as well as highlighted terms of interest are added to the new keyword list for subsequent cluster analysis. From step 356, the routine of FIG. 15 exits.

Figure 16:
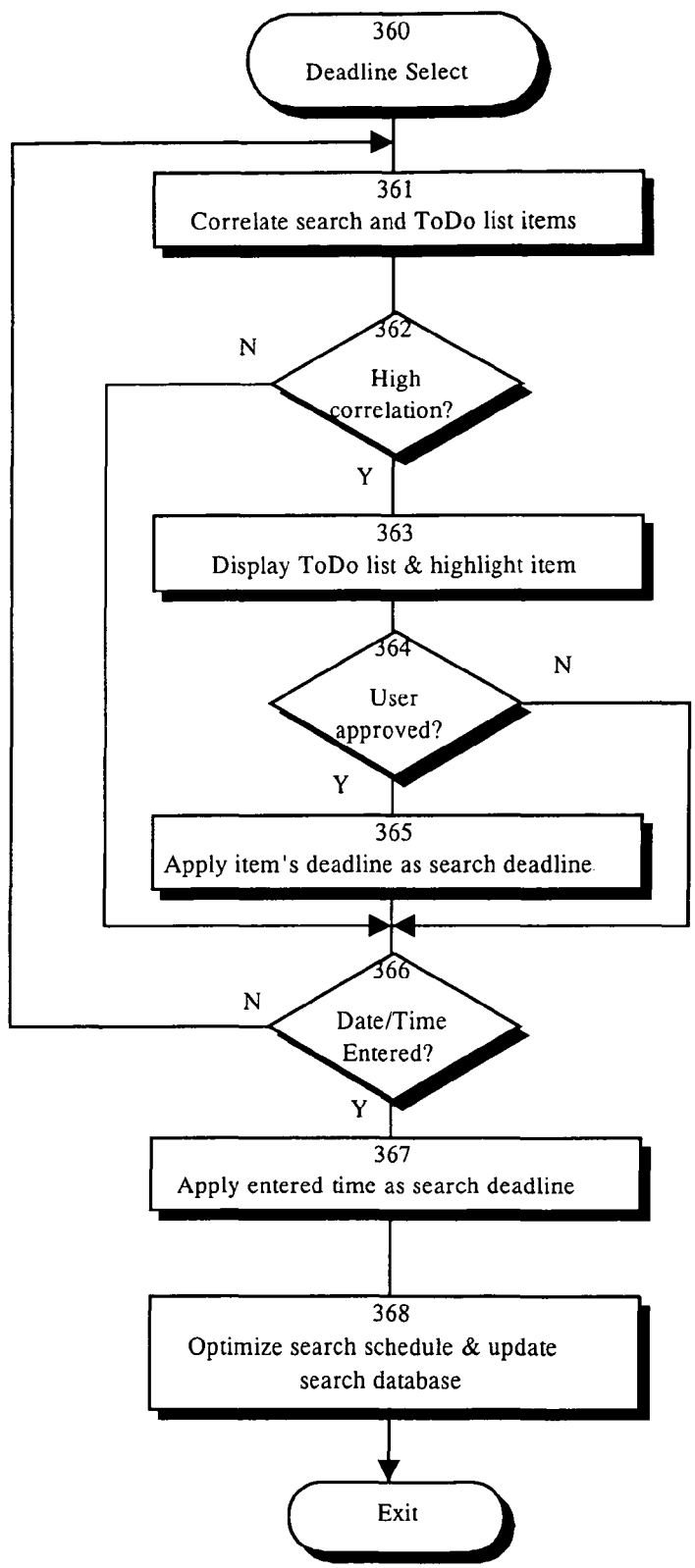
FIG. 16 is a flowchart illustrating the operation of a deadline management system for the information locator of FIG. 12.

Referring now to FIG. 16, the routine to determine the deadline associated with a particular search request is detailed. In FIG. 16, the routine moves to step 361 where it correlates the terms of the search and the ToDo list items. In step 362, in the event of a high correlation between the search request and the ToDo item, the routine proceeds to step 363 where it highlights the ToDo list item and links the item to the search word. Next, in step 364, the routine checks for user approval of the determined relationship. If the user accepts, the routine proceeds from step 364 to step 365 where it extracts the deadline associated with the ToDo list item and tags the search request with the same deadline. From step 365, or in the event that the test in step 362 or 364 is negative, the routine moves to step 366 where it further checks if the user has specified particular deadlines. If not, the routine loops back to step 361 to continue the deadline determination process. Alternatively, in the event that the user has defined a deadline, the date and time selected by the user overrides the system determined deadline. Thus, in step 367, the entered date and time deadline is applied as the deadline for the search. Next, in step 368, the search scheduler proceeds through an optimization process to maximize the search broadcast frequency while minimizing cost. A number of numerical optimization processes may be used. Additionally, simulated annealing may be used to optimize the search schedule. Once optimized, the search database is updated with the new schedule in step 368.

Figure 17:
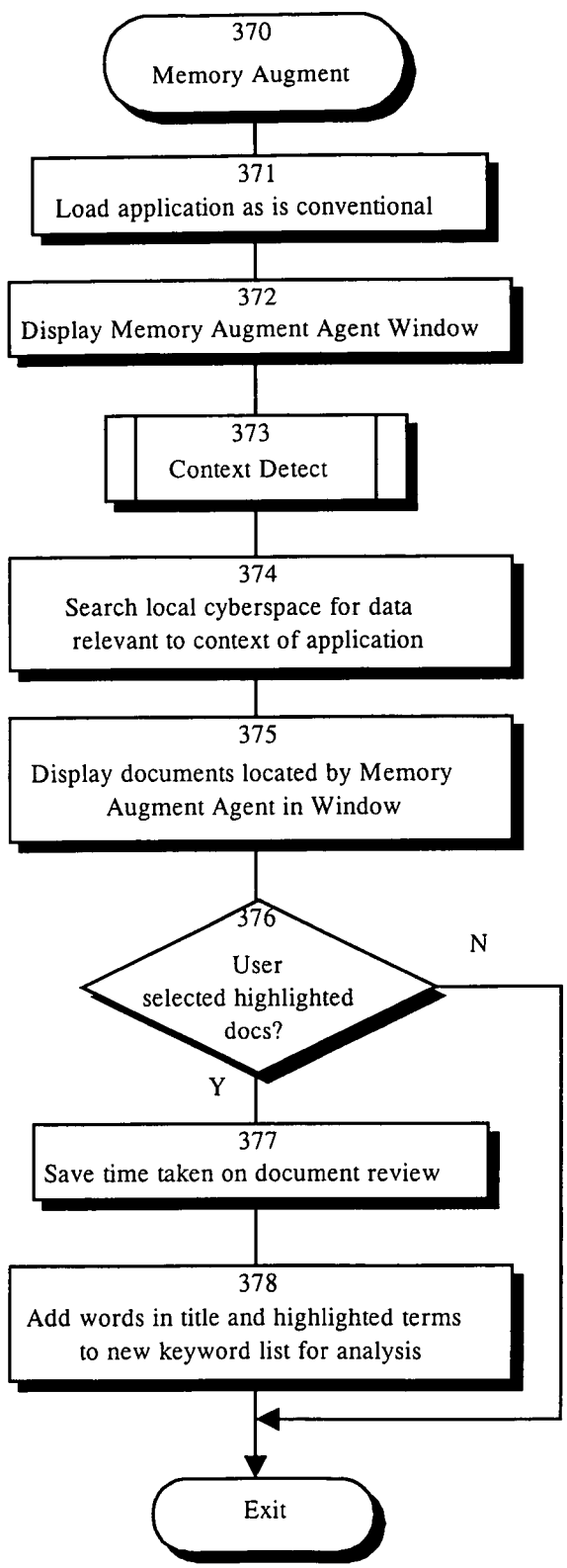
FIG. 17 is a flowchart illustrating the operation of the assistant of FIG. 4 as a memory augmentation device for the user.

Turning now to FIG. 17, the process for applying the electronic assistant as a memory augmentation unit for the user is detailed. In FIG. 17, the routine loads the application as conventionally loaded in step 371. Next, in step 372, the routine opens a Memory Augment Agent window which allows the assistant to interface with the user in a memory augmentation mode. Next, the routine of FIG. 17 detects the application context in step 373. This step is illustrated in more detail in FIG. 18.

From step 373, the routine of FIG. 17 proceeds to step 374 where it searches the local disk space for data relevant to the context of the application, as detected in step 373. Next, in step 375, it displays relevant documents in the memory augment window opened in step 372. From step 375, the routine checks in step 376 if the user exhibits any interest in the documents displayed in the memory augment window. If so, the routine moves from step 376 to step 377 where it captures the time and the number of hypertext links the user selected while viewing the displayed document. The information captured in step 377 is analyzed in step 378 where words in the title and highlighted terms are added to the new keyword list for subsequent analysis of user preferences and patterns. From step 378, the routine of FIG. 17 exits.

Figure 18:
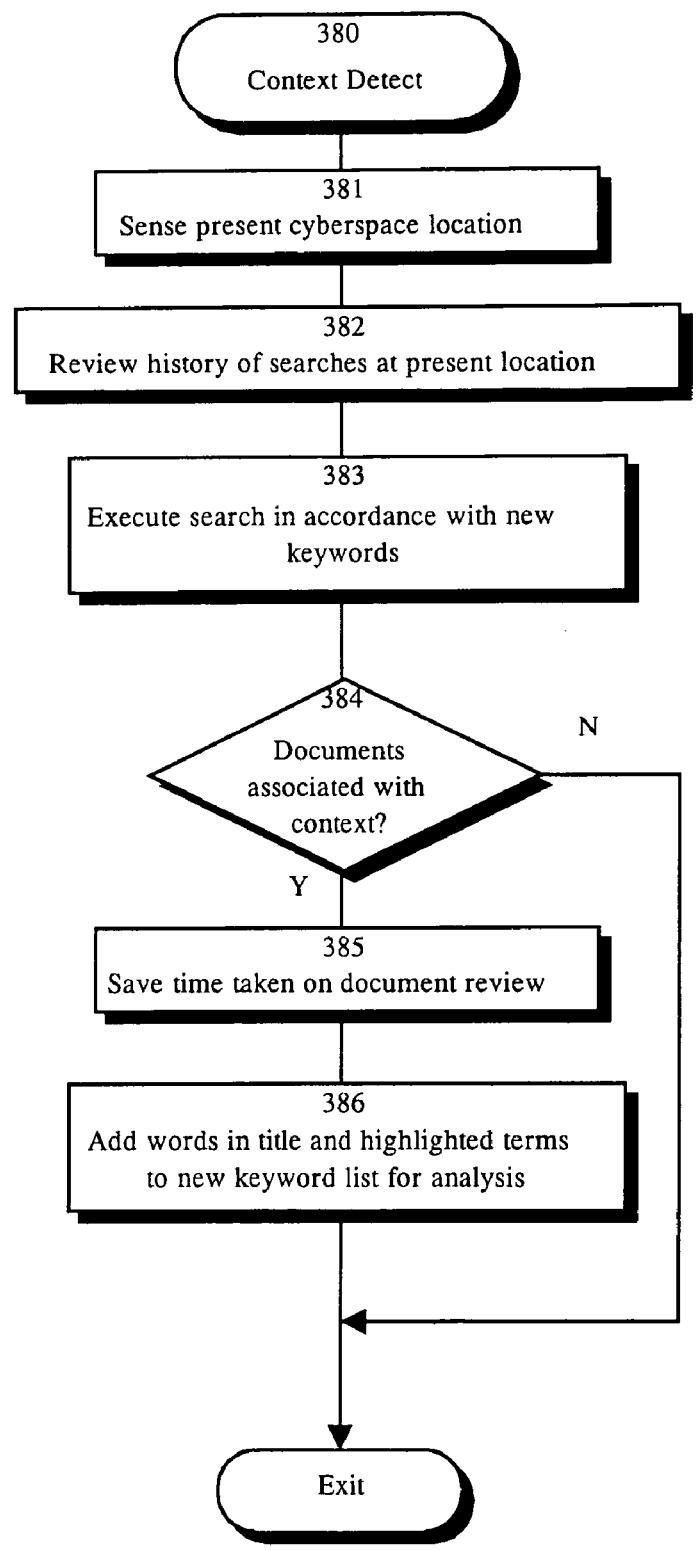
FIG. 18 is a flowchart illustrating the process for detecting context changes in conjunction with the memory augmentation device of FIG. 17.

Turning now to FIG. 18, the process for detecting the context of FIG. 17 is illustrated in more detail. In FIG. 18, the routine proceeds to step 381 where it senses its present location in cyberspace. The location of the assistant in cyberspace is specified in terms of the application, a conventional directory address or a hyperlink address. Additionally, step 381 detects the current cyberspace environment where the assistant is operating from.

Next, in step 382, the routine reviews the history of searches previously performed at the cyberspace location. The historical analysis is then used to enhance the search query. In step 383, the routine executes the search in accordance with the revised keywords. Next, in step 384, the routine checks for potential association between the documents located by the search and the cyberspace context where the assistant is located. If a relationship exists, the routine moves from step 384 to step 385 where it captures user interest in the displayed search results by tracking time spent on each document as well as hypertext links selected within each document. Next, in step 386, the routine extracts and adds the new keywords and concepts into the new keyword list for subsequent analysis before the routine of FIG. 18 exits.

Figure 19:
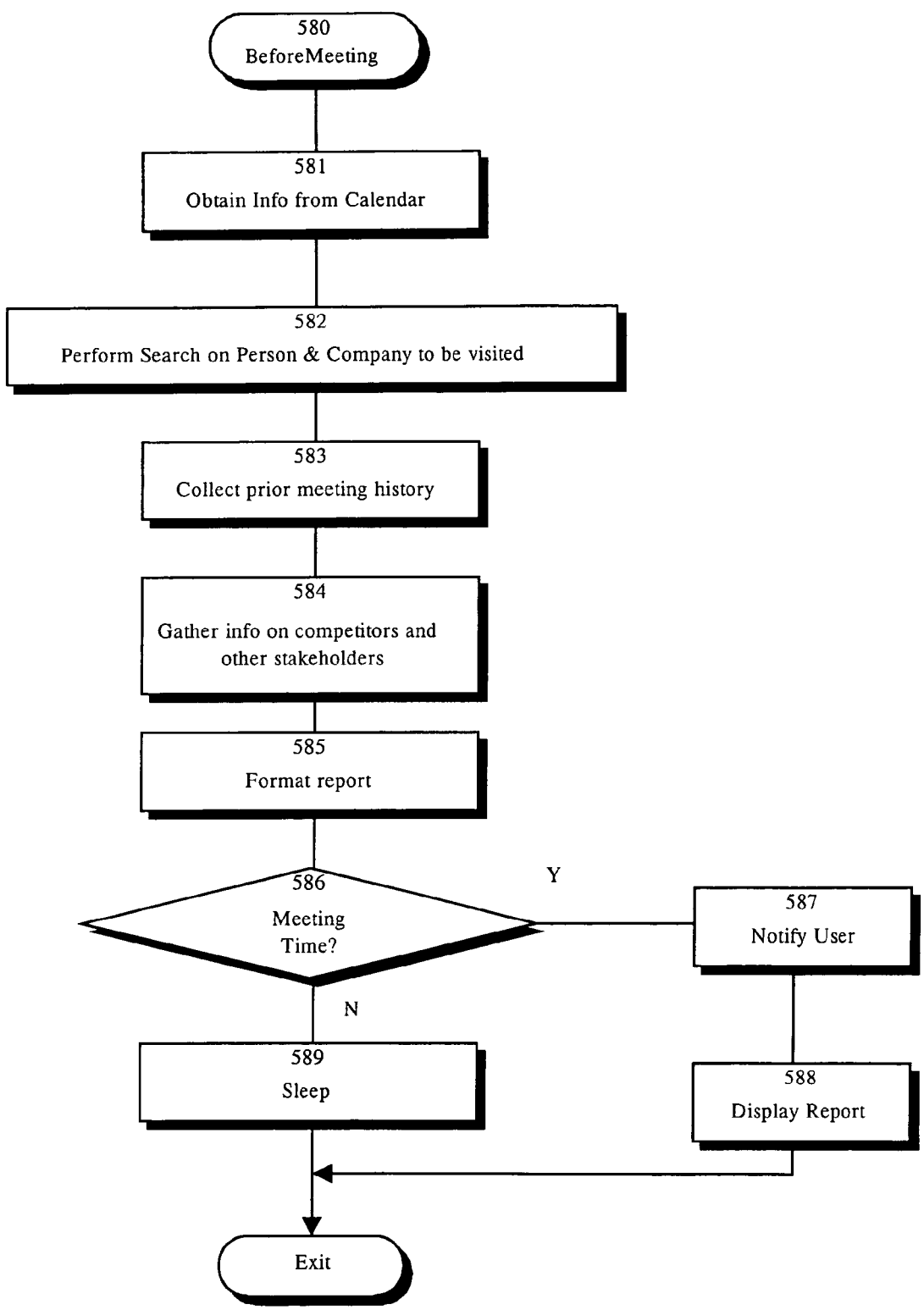
FIG. 19 is a flowchart illustrating the process in the computer of the present disclosure which prepares information needed for a meeting.
Figure 20:
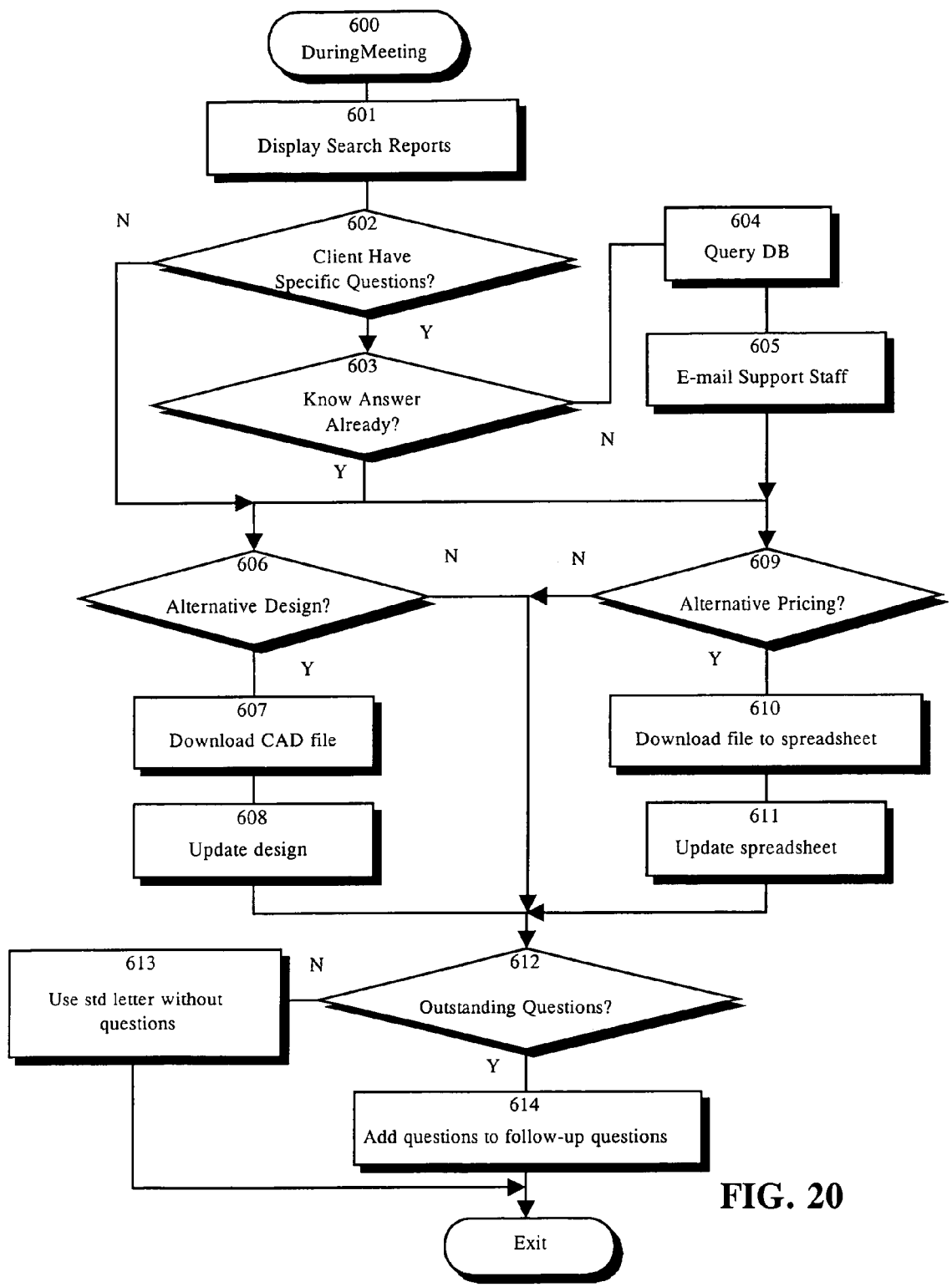
FIG. 20 is a flowchart illustrating the process for collecting data and interacting with various information networks using the computer of the present disclosure during the meeting.
Figure 21:
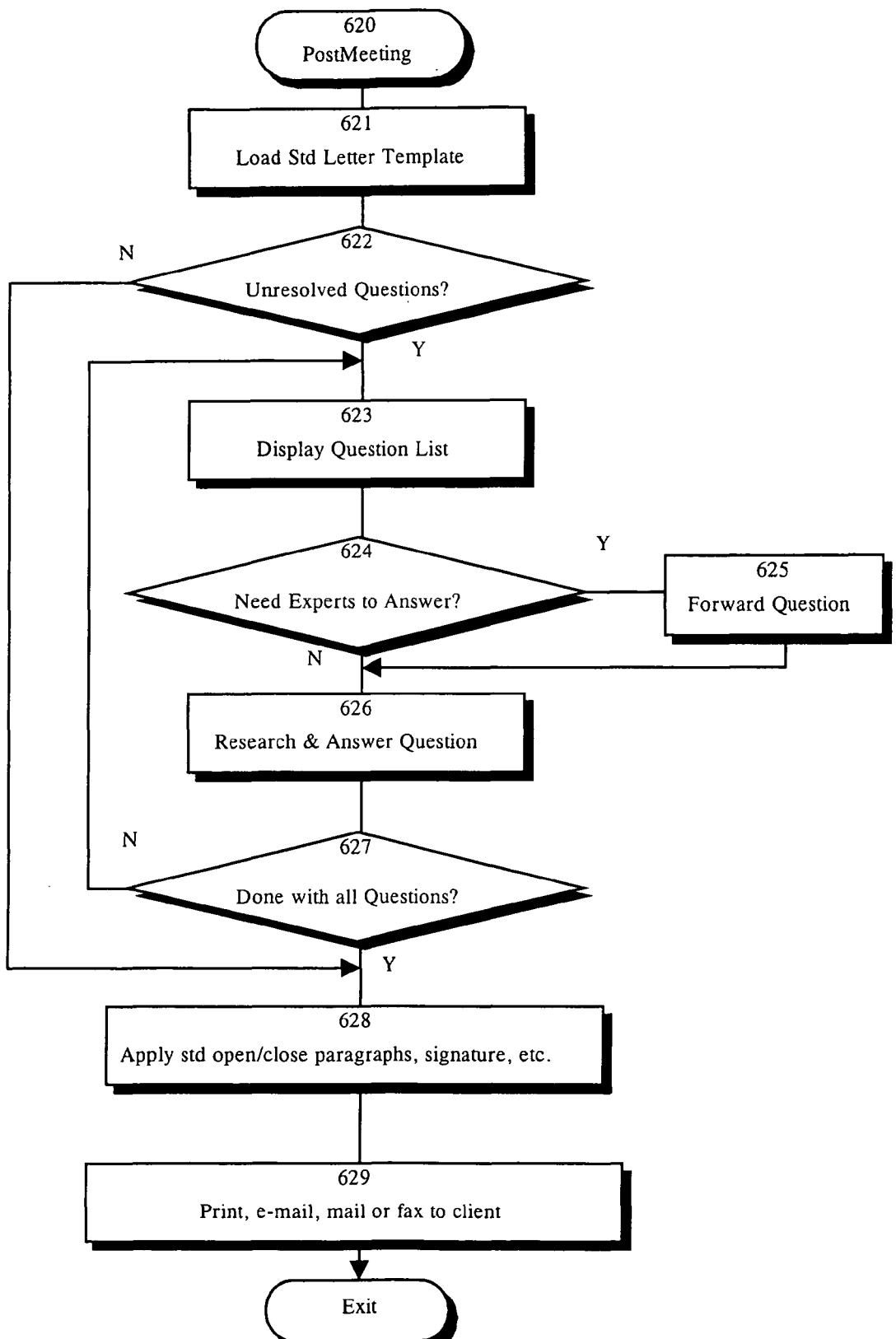
FIG. 21 is a flowchart illustrating the process for following up on outstanding action items with the assistant of the present disclosure.

Until now, the details of the electronic assistant have been individually detailed. FIGS. 19-21 illustrate the power of the electronic assistant in autonomously foraging and retrieving information of interest for the user in a particular setting of a business environment. Referring to FIGS. 19 through 21, routines for supporting a meeting using the electronic assistant of the present disclosure are shown. The routines in FIGS. 19 through 21 provide automated support for mobile users and in effect act as an intelligent researcher or agent for the users. The agent is necessary to protect the user from an increasing information overload in modern life while allowing the user to maintain control.

FIG. 19 illustrates the detail of the data search and preparation before a meeting takes place. From step 580, the routine of FIG. 19 proceeds to step 581 where the routine checks with the calendar engine for meetings scheduled for a particular date. From step 581, for each meeting calendared, the routine performs a search on the company and individuals scheduled for the meeting in step 582. Next, the routine checks in its internal records for historical data of prior meetings in step 583. In this step, the routine also attempts to identify areas of agreement and disagreement, as well as the personal information of the people in the meeting to remind and prepare the user of hot-spots to be careful on in the meeting.

From step 583, the routine of FIG. 19 proceeds to step 584 where it searches for information relating to the competition as well as other potential stakeholders. The search starts with in-house data and sweeps outwardly toward the Internet 150 using the intelligent assistant of FIG. 4. As a first step, the agent of FIG. 19 enters the respective competitor's name into search engines such as Yahoo, AltaVista, HotBot or Infoseek. The agent may also check the competitor's financial health by performing a search in Hoover's Online, located at http://www.hoovers.com, and a search at the U.S. Securities & Exchange Commission, located at http://www.sec.gov. Other sites with financial information on public and private companies that can be searched by the agent of FIG. 19 include http://www.pathfinder.com, http://www.avetech.com, http://www.dbisna.com.

For general news regarding a particular company, the agent of FIG. 19 can search Ecola's 24-hour newsstand, located at http://www.ecola.com, which links to more than 2,000 newspapers, journals, magazines and publications. Additionally, the agent can search CNN Interactive at http://www.cnn.com for archived information going back a few weeks. Furthermore, the agent of FIG. 19 can search the Knowledge Index on Compuserver, and the Electric Library, available at http://www.elibrary.com, for scouring magazines, reference works and news wires. Furthermore, MediaFinder, located at http://www.mediafinder.com, provides an index and description of thousands of newsletters, catalogs and magazines.

The agent of FIG. 19 also provides the ability to listen in on conversations regarding a particular company by news groups and discussion groups prevalent in the Usenet section of the Internet 150. For a searchable directory of E-mail discussion groups, the agent of FIG. 19 reviews Deja News Research Service, located at http://www.dejanews.com, and Liszt, located at http://www.liszt.com.

As a last resort when the above searches turn up empty, the agent of step 584 checks sites that have compiled good collections of business resources, including John Makulowich's Awesome Lists, located at http://www.clark.net, American Demographics, located at http://www.demographics.com, ProfNet, located at http://www.vyne.com, StartingPoint, located at http://www.stpt.com, Babson College, located at http://babson.edu, and Competitive Intelligence Guide, located at http://www.fuld.com. Additionally, the present disclosure contemplates that yet other sites can be searched as well for competitive information, including the Lexis/Nexis database, the Westlaw database, various judicial decisions at Villanova University, licensing information from Licensing Executive Society at http://www.les.org, and the patent abstract information database from the U.S. Patent & Trademark Office, or alternatively, abstracts from MicroPatent, located at http://www.micropat.com, among other sites.

From step 584, the routine formats the collected information of steps 583-584 in step 585. Next, the routine proceeds to step 586 where it checks to see if it is time to meet. If so, the routine proceeds to step 587 where it notifies the user of the meeting and displays the formatted report of step 585 in step 588. Alternatively, if it is not yet meeting time in step 586, the routine proceeds to step 589 where it puts itself to sleep until the next check interval. From step 588 or 589, the routine of FIG. 19 exits.

Turning now to FIG. 20, the processes occurring during the meeting scheduled in FIG. 19 are shown in more detail. From step 600, the routine proceeds to step 601 where it displays the reports generated in step 585 of FIG. 19. Further, the routine checks in step 602 whether the customer or client has specific questions. If so, the routine proceeds to step 603 where, in the event that the user does not know the answer already, the routine jumps to step 604 where it queries a database and allows the user to electronically mail questions to the technical staff in step 605.

From steps 602, 603 or 605, the routine proceeds in two parallel paths. In the event where a customized design is necessary for the customer in step 606, the routine proceeds from step 606 to step 607. In step 607, the routine downloads the requisite computer aided design (CAD) file for editing purposes. From step 607, the routine proceeds to step 608 where the design can be updated using a number of tools, including the tools disclosed in the incorporated by reference patent applications.

From steps 602, 603 or 605, the routine of FIG. 20 also checks if the customer desires an alternative pricing in step 609. If so, the routine downloads pricing information from the host to the portable computer in step 610 and applies the spreadsheet discussed above to the data in step 611.

From steps 606, 609, 608 or 611, the routine proceeds to step 612 where it checks if outstanding questions remains. If not, the routine proceeds from step 612 to step 613 where it flags that a standard follow-up letter without questions is to be used. Alternatively, in the event that outstanding questions remain to be answered, the routine proceeds from step 612 to step 614 where it adds to the list of follow-up questions. From step 613 or 614, the routine of FIG. 20 exits.

Referring now to FIG. 21, the routine to process events after the meeting is shown. From step 620 of FIG. 21, the routine proceeds to step 621 where it loads a standard letter template which provides the foundational structure for the correspondence. From step 621, the routine checks if unresolved questions remain in step 621. If so, the routine proceeds to step 623 where it displays the question list in step 623 to remind the user of the items to be addressed in the correspondence. Next, in step 624, in the event that the answer requires an expert, the routine proceeds from step 624 to step 625 where the routine forwards the question to the appropriate person.

From step 624 or step 625, the routine proceeds to step 626 where the question is answered. Next, in step 627, the routine checks if it is done with all questions. If not, the routine loops back to step 623 to answer the next question in the list. Alternatively, if all questions have been answered in step 627 or step 622, the routine proceeds to step 628 where it applies standard closing paragraphs as well as a signature facsimile. Furthermore, to the extent some personalized compliments or congratulations can be made, as identified in step 582 of FIG. 19, the routine also applies these congratulatory remarks to the correspondence. Next, in step 629, the routine prints, e-mails, postal mails, or faxes the correspondence to the client or customer before exiting FIG. 21.

Figure 22:
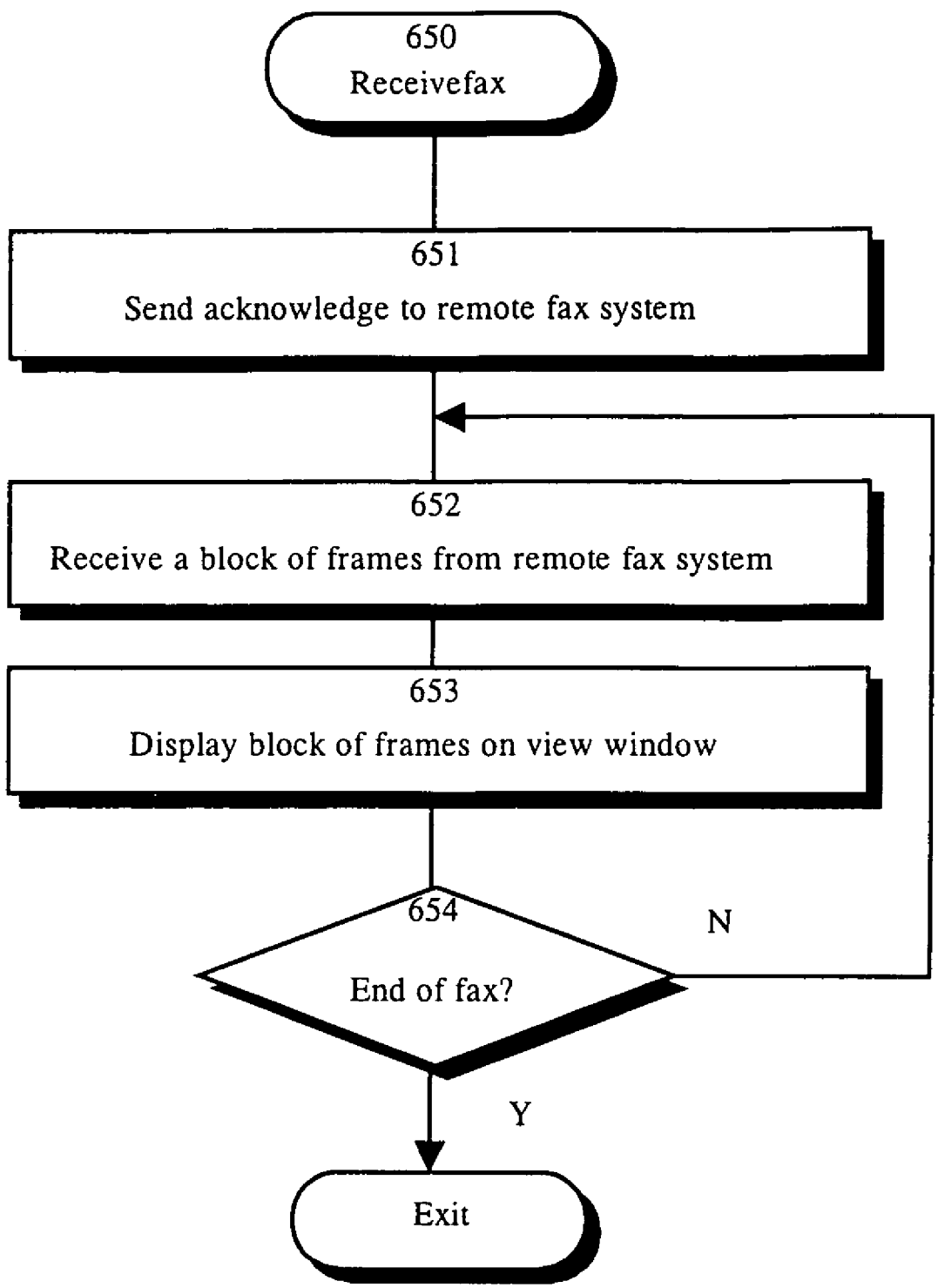
FIG. 22 is a flowchart illustrating the receiving operation of a fax-modem of FIG. 1.
Figure 23:
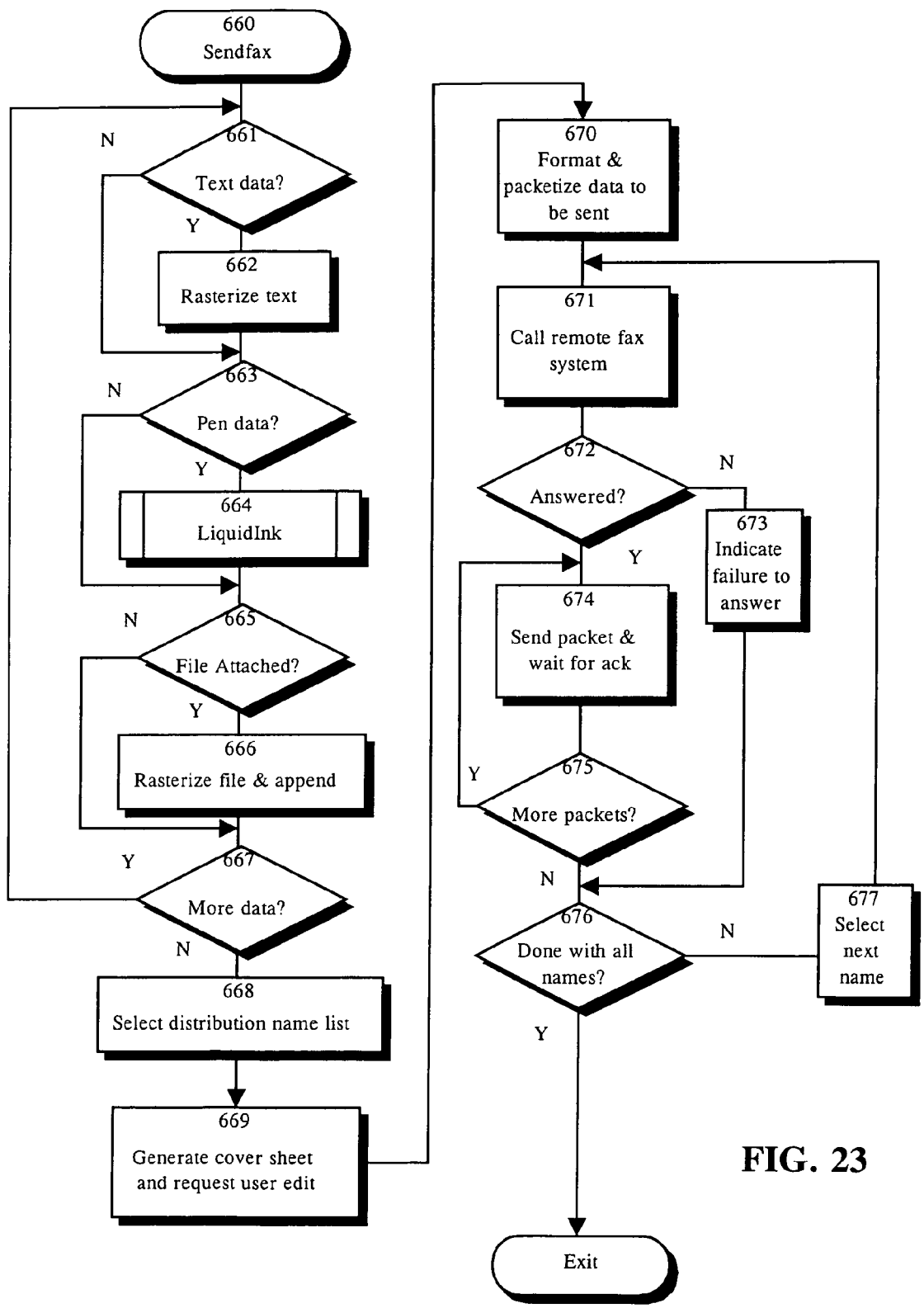
FIG. 23 is a flowchart illustrating the sending operation of the fax-modem of FIG. 1.
Figure 24:
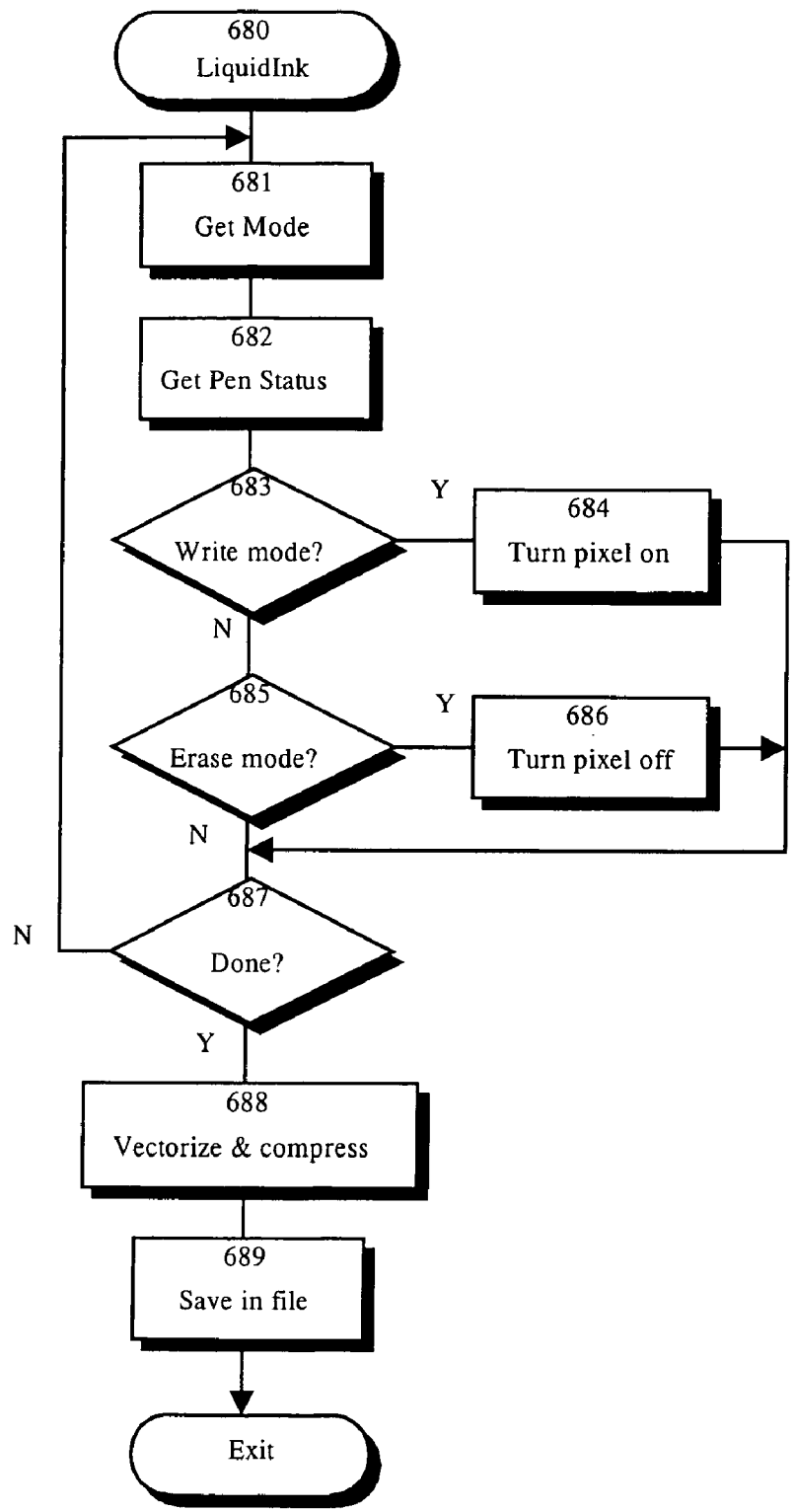
FIG. 24 is a flowchart illustrating the data entry operation associated with the facsimile transmission process of FIG. 23.

Turning now to FIGS. 22-24, the processes associated with transmitting and receiving facsimile data using the computer of FIG. 1 is shown in more detail. In FIG. 22, the process for receiving a facsimile is shown. From step 650, the routine answers the incoming call from the remote facsimile unit in step 651. Next, it receives and displays one or more blocks of facsimile information in steps 652-654. The routine of FIG. 22 receives frames of facsimile data in step 652 and displays the information in step 653. In step 654, the routine checks for an end-of-facsimile signal from the remote facsimile machine. If true, the routine exits. Alternatively, the routine of FIG. 22 loops back to step 652 to continue receiving and displaying the facsimile information to the user. The process for sending and receiving facsimile information is known in the art and is discussed in more detail in Michael Holmes and Robert Flanders' book entitled "C++ Communications Utilities," published by PC Magazine and hereby incorporated by reference.

Referring now to FIG. 23, the process for sending a fax from the computer of FIG. 1 is shown in more detail. From step 660, the routine moves to step 661 where it checks if the data to be sent is text data. The text data can be typed, or entered using the Graffiti non-cursive handwriting recognizer. If the data entered is textual, the routine proceeds to step 662 where it rasterizes the text using a table look-up and substitute process. From step 661 or 662, the routine then checks if signatures or other hand sketches and illustrations have been entered. If so, the routine proceeds to step 664 to capture the hand sketch or liquid-ink, as discussed in more detail in FIG. 24. From step 663 or 664, the routine of FIG. 23 checks for attached file(s) in step 665. If so, the routine proceeds to step 666 where it opens the file(s), rasterizes the file(s) and appends the raster information to the file to be sent to the fax-modem. Next, the routine checks if additional data needs to be appended to the fax file in step 667. If so, the routine loops back to step 661 to continue the conversion and fax formatting process.

From step 667, in the event that the temporary file for sending the fax has been completed, the routine of FIG. 23 proceeds to step 668 where it obtains a list of names for distribution purposes. In step 669, the routine generates a cover sheet for the user and waits for user approval or edit if necessary. Next, in step 670, the routine formats and packetizes the data to be sent to the remote facsimile machine.

From step 670, the routine calls the remote facsimile unit in step 671. Next, if the remote fax machine fails to answer in step 672, the routine proceeds to step 673 where it indicates a failure before proceeding to step 676 to handle the next name in the distribution list. Alternatively, in the event that the remote fax machine answers in step 672, the routine proceeds to step 674 where it sends the packet and waits for acknowledgment from the remote fax machine in step 674 before continuing to send the next packet in step 675. From step 675, the routine checks if more packets remain to be sent. If so, the routine loops back to step 674 to continue the faxing process. Alternatively, the routine moves from step 675 to step 676 to send the fax to the next individual in the distribution list. In step 676, if the fax has not been sent to all members of the distribution list, the routine of FIG. 23 moves from step 676 to step 677 where it selects the next name in the distribution list to receive the fax. Alternatively, in the event that the fax has been sent to all members in the list, the routine of FIG. 23 exits.

Turning now to FIG. 24, the process for capturing liquid inks, including signatures, sketches, and free hand illustrations is shown. In FIG. 24, the routine retrieves a mode from the user in step 681. The mode includes a write mode or an erase mode. Next, the routine obtains a status of the pen 33 to locate the position of the pen 33 in step 682. The routine then proceeds to step 683 where it checks if the user has selected the write mode. If so, the routine proceeds from step 683 to step 684 to turn the LCD display 45's pixels on whenever the pen 33 is down on the surface of the digitizer 34.

In the event that the user is in the erase mode, the routine proceeds from step 683 to step 685. From step 685, in the event that the pen is down, the routine turns the LCD 45's pixel off in step 686. From step 684 or 686, the routine continues to step 687 where it checks if the user has completed the liquid ink data entry process. If not, the routine loops back to step 681. Alternatively, if done, the routine proceeds from step 687 to step 688 where it vectorizes the data and compresses the information using vectorizers and compression units known in the art. Next, it saves the data entered into a file in step 689 before exiting FIG. 24.

The assistant of the present disclosure thus transparently assists the user in performing requests and compiling his profile. The user does not need to be aware of what is available on the network; how this information is structured and organized; where the repositories are localized; what retrieval services are at his/her disposal. The assistant deduces the user's information needs by both communicating with the user and observing his or her behavior to deduce what actions are to be performed and how to modify the current user's profile. The user may or may not be aware of the learning or training of the electronic assistant, depending on both the user features and the processing step. The interface assistant translates the requests of the user and selects other experts or agents who can solve the user's problems. In this manner, the user interacts with a personalized interface to allow him to completely ignore the structure of the system he is interacting with or how the system works. Further, the assistant of the present disclosure acquires and retains an interest profile of its user and acts upon one or more goals based upon that profile. The assistant further acts autonomously, pursuing the goals posed to it by its user, irrespective of whether the user is connected to the system where the assistant is based. The assistant also apprises its user of progress towards outstanding goals, and present preliminary results during the acquisition of information in the satisfaction of a goal.

Although specific embodiments of the present disclosure have been illustrated in the accompanying drawings and described in the foregoing detailed description, it will be understood that the claimed subject matter is not limited to the particular embodiments described herein, but is capable of numerous rearrangements, modifications, and substitutions without departing from the scope of the disclosure. The following claims are intended to encompass all such modifications.

What is claimed is:

1. An electronic assistant system for managing and scheduling user calendar events, the electronic assistant system comprising:
   a computer device comprising:
   an event scheduler configured to:
   schedule incoming user calendar event requests using an autonomous agent;
      wherein the autonomous agent, without explicit user request, gathers information of interest to the user;
   display to the user an incoming event request and a summary of related events previously scheduled;
   determine whether the incoming event request conflicts with a previously scheduled user calendar event;
   retrieve a history of events similar to the previously scheduled user calendar event to derive an expected event duration of the previously scheduled user calendar event;
   replace time allocated for the previously scheduled user calendar event with the expected event duration;
   using a current location of a user's handheld device, determine a travel time from a location of the previously scheduled user calendar event to a location of the incoming event request, to be an estimated transit time;
   add the estimated transit time from the previously scheduled user calendar event to the incoming event request;
   subtract the estimated transit time from a start time of a next scheduled event;
   check if the subtracted time overlaps into the time requested for the incoming event request; and
      if so, indicate an error; and if not, assist the user in scheduling the incoming event request based on the location and the estimated transit time.

2. The electronic assistant of claim 1, comprising a host assistant running on a computer or a server and coupled to a processor and an information locator, wherein the host assistant is configured to dynamically adapt to user styles, techniques, preferences or interests, update user styles, techniques, preferences or interests in a knowledge warehouse, and instruct the information locator to locate data of interest in one or more information sources for the user based on the user styles, techniques, preferences or interests.

3. The electronic assistant of claim 2, wherein each of the one or more information sources has a query interface subject to one or more changes, wherein the information locator is configured to adapt to changes in the query interface in formulating a query and track an evolution of the user's interests by maintaining a dynamic profile that takes the user's behavior into account, wherein a specificity of the dynamic profile increases with the user's awareness about available information, and wherein using the dynamic profile, the assistant is configured to launch the autonomous agent to navigate through the network hunting for information of interest for the user.

4. The electronic assistant of claim 3, wherein the query is associated with a cost limitation, and wherein the information locator executes a query formulation and submission strategy to minimize cost.

5. The electronic assistant of claim 3, wherein the query has a priority level, wherein the event scheduler is further configured to determine a deadline required for the query and increase the priority level of the query as the deadline approaches, and wherein the event scheduler is configured to accept or decline an appointment based on a timing analysis and a user preference.

6. The electronic assistant of claim 1, further comprising: one or more remote information sources; and
a communications system coupling an information locator with the remote information sources, wherein the remote information sources are located on a wide area network, the Internet or the World Wide Web.

7. The electronic assistant of claim 1, further comprising a calendar engine coupled to an information locator to automatically collect information about a calendar activity for the user.

8. The electronic assistant of claim 5, wherein the event scheduler is further configured to dynamically generate a schedule by incrementally building plans at multiple levels of abstraction to reach a goal.

9. The electronic assistant of claim 6, wherein the communications system comprises:
a data transformer coupling the information locator to the remote information sources, the data transformer rearranging data prior to transmission to minimize communications cost.

10. A computer system for supporting a user having particular styles, techniques, preferences or interests, the computer system comprising:
a host computer including:
a host knowledge warehouse coupled to a processor, wherein the host knowledge warehouse is configured to store user styles, techniques, preferences or interests; and
an information locator coupled to the host knowledge warehouse, wherein the information locator is configured to generate a query conforming to user characteristics for retrieving data of interest and broadcasting the query to one or more information sources through semantic agents to navigate through a network hunting for information of interest for the user, wherein the information locator is further configured to receive results of the broadcasted query, communicate the results to the user, and update the host knowledge warehouse with responses from the user to the results; and
a portable computer adapted to communicate with the host computer, the portable computer including:
a processor; and
an electronic assistant coupled to the processor and an event scheduler, wherein the event scheduler is configured to:
schedule incoming user calendar event requests using an autonomous agent;
wherein the autonomous agent, without explicit user request, gathers information of interest to the user;
display to the user an incoming event request and a summary of related events previously scheduled;
determine whether the incoming event request conflicts with a previously scheduled user calendar event;
retrieve a history of events similar to the previously scheduled user calendar event to derive an expected event duration of the previously scheduled user calendar event;
replace time allocated for the previously scheduled user calendar event with the expected event duration;
using a current location of a user's handheld device, determine a travel time from a location of the previously scheduled user calendar event to a location of the incoming event request, to be an estimated transit time;
add the estimated transit time from previously scheduled event to the incoming event request;
subtract the estimated transit time from a start time of a next scheduled event;
check if the subtracted time overlaps into the time requested for the incoming event request; and
if so, indicate an error; and if not, assist the user in scheduling the incoming event request based on the location and the estimated transit time.

11. The computer system of claim 10, wherein each of the one or more information sources has a query interface subject to one or more changes, and wherein the information locator is configured to adapt to changes in the query interface in formulating a query.

12. The computer system of claim 10, wherein the query is associated with a cost limitation, and wherein the information locator executes a query formulation and submission strategy to minimize cost.

13. The computer system of claim 10, wherein the query has a priority level, wherein the event scheduler is coupled to the information locator, and wherein the event scheduler is further configured to determine a deadline required for the query and increase the priority level of the query as the deadline approaches.

14. The computer system of claim 10, further comprising:
one or more remote information sources located on a wide area network or on the Internet; and
a communications system coupling the information locator with the remote information sources.

15. A computer system for supporting a user having particular styles, techniques, preferences or interests, the computer system comprising:
a host computer, including:
a host knowledge warehouse coupled to a processor, wherein the host knowledge warehouse is configured to store user styles, techniques, preferences or interests; and
an information locator coupled to the host knowledge warehouse, wherein the information locator is configured to generate a query conforming to user characteristics for retrieving data of interest and broadcasting the query to one or more information sources through autonomous software agents to navigate through a network hunting for information of interest for the user, wherein the information locator is further configured to receive results of the broadcasted query, communicate the results to the user, and update the host knowledge warehouse with responses from the user to the results; and
a handheld device adapted to communicate with the host computer, the handheld device including a computer-implemented assistant coupled to the information locator, wherein the assistant is configured to dynamically adapt to the user styles, techniques, preferences or interests, update the user styles, techniques, preferences or interests in the host knowledge warehouse, and instruct the information locator to locate data on events of interest for the user based on the user styles, techniques, preferences or interests through the autonomous software agents to navigate through the network hunting for information of interest for the user, and wherein, autonomously and without explicit user request, the assistant is configured to schedule and execute multiple information retrieval tasks in accordance with user priorities, deadlines and preferences;

wherein the assistant further includes an event scheduler, wherein the event scheduler is configured to:
- schedule incoming user calendar event requests based on using an autonomous agent;
  - wherein the autonomous agent, without explicit user request, gathers information of interest to the user;
- display to the user an incoming event request and a summary of related events previously scheduled;
- determine whether the incoming event request conflicts with a previously scheduled user calendar event;
- retrieve a history of events similar to the previously scheduled user calendar event to derive an expected event duration of the previously scheduled user calendar event;
- replace time allocated for the previously scheduled user calendar event with the expected event duration;
- using a current location of the handheld device, determine a travel time from a location of the previously scheduled user calendar event to a location of the incoming event request, to be an estimated transit time;
- add the estimated transit time from the previously scheduled event to the incoming requested event;
- subtract the estimated transit time from a start time of a next scheduled event;
- check if the subtracted time overlaps into the time requested for the incoming event request; and
  - if so, indicate an error; and if not, assist the user in scheduling the incoming event request based on the location and the estimated transit time.

16. The computer system of claim 15, wherein the assistant is configured to generate a trip itinerary.

17. The computer system of claim 15, wherein the one or more information sources comprise computer data on the Internet responsive to a query, wherein the event scheduler is configured to analyze durations, deadlines, and delays within a plan while scheduling information retrieval tasks, wherein a schedule is dynamically generated by incrementally building plans at multiple levels of abstraction to reach a goal and the plans are continually updated by information received from the assistant, the information allowing the event scheduler to adjust the plan to unplanned events, wherein the assistant is configured to spawn a child process which sends a query to one or more remote database engines and while search results are displayed to the user, user interaction with the search results is monitored in order to determine relevancy of the search result or user interest in the search.

18. The computer system of claim 15, wherein the assistant is configured to automatically recommend an event or a service for the user based on the user styles, techniques, preferences or interests.

19. he computer system of claim 15, wherein the assistant comprises two personalities, one residing on the handheld device interacting with the user and one residing on the host computer with the information locator executing searches in a background, and when results are found, the assistant residing on the host computer is configured to prioritize the retrieved information and transform data sent to the handheld computer for fast and robust wireless transmission.

* * * * *

UNITED STATES PATENT AND TRADEMARK OFFICE
CERTIFICATE OF CORRECTION

| | |
|---|---|
| PATENT NO. | : 8,131,718 B2 |
| APPLICATION NO. | : 11/301561 |
| DATED | : March 6, 2012 |
| INVENTOR(S) | : Tran |

It is certified that error appears in the above-identified patent and that said Letters Patent is hereby corrected as shown below:

Title page, under "Primary Examiner", in Column 2, Line 1, delete "Naveen" and insert -- Neveen --.

Column 38, line 22, in Claim 19, delete "he" and insert -- The --.

Signed and Sealed this
Fourth Day of September, 2012

David J. Kappos
*Director of the United States Patent and Trademark Office*